US007633392B2

(12) United States Patent
Neuwirth

(10) Patent No.: US 7,633,392 B2
(45) Date of Patent: Dec. 15, 2009

(54) RADIO FREQUENCY IDENTIFICATION ASSET MANAGEMENT SYSTEM, AND COMPUTER PROGRAM PRODUCT

(75) Inventor: Daniel Neuwirth, Glen Allen, VA (US)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 11/121,954

(22) Filed: May 5, 2005

(65) Prior Publication Data
US 2005/0253704 A1 Nov. 17, 2005

Related U.S. Application Data

(60) Provisional application No. 60/567,770, filed on May 5, 2004.

(51) Int. Cl.
G08B 13/14 (2006.01)
(52) U.S. Cl. ............... 340/572.1; 340/10.1; 340/539.1; 235/385; 705/22
(58) Field of Classification Search ............ 340/539.13, 340/572.1, 10.1, 825.49; 235/385
See application file for complete search history.

(56) References Cited

U.S. PATENT DOCUMENTS

| | | | | |
|---|---|---|---|---|
| 5,635,693 | A * | 6/1997 | Benson et al. ............ 340/10.33 |
| 6,040,774 | A * | 3/2000 | Schepps ................. 340/572.1 |
| 6,112,152 | A * | 8/2000 | Tuttle .................... 701/115 |
| 6,127,917 | A | 10/2000 | Tuttle |
| 6,232,877 | B1 * | 5/2001 | Ashwin ................. 340/572.1 |
| 6,353,390 | B1 | 3/2002 | Beri et al. |
| 6,366,216 | B1 * | 4/2002 | Olesen ................. 340/825.49 |
| 6,427,913 | B1 * | 8/2002 | Maloney .................. 235/383 |
| 6,509,828 | B2 * | 1/2003 | Bolavage et al. ........... 340/10.1 |
| 6,552,661 | B1 | 4/2003 | Lastinger et al. |
| 6,600,418 | B2 * | 7/2003 | Sainati et al. ............ 340/572.1 |
| 6,708,879 | B2 * | 3/2004 | Hunt ..................... 235/385 |
| 6,850,161 | B1 | 2/2005 | Elliott et al. |
| 6,901,304 | B2 * | 5/2005 | Swan et al. ................ 700/115 |
| 6,963,277 | B2 * | 11/2005 | Imasaki et al. ........... 340/539.1 |
| 6,972,682 | B2 * | 12/2005 | Lareau et al. ............ 340/568.1 |
| 7,049,942 | B2 * | 5/2006 | Gallovich ............... 340/426.1 |
| 7,099,895 | B2 | 8/2006 | Dempsey |
| 7,136,832 | B2 * | 11/2006 | Li et al. .................... 340/505 |
| 7,180,422 | B2 * | 2/2007 | Milenkovic et al. ....... 340/572.4 |
| 7,319,395 | B2 * | 1/2008 | Puzio et al. ............. 340/572.1 |
| 2002/0008621 | A1 | 1/2002 | Barritz et al. |
| 2002/0080032 | A1 * | 6/2002 | Smith et al. ............. 340/572.1 |

(Continued)

FOREIGN PATENT DOCUMENTS

WO    WO 96/35289    11/1996

OTHER PUBLICATIONS

Karen M. Furlani et al., "Architecture for Discrete Construction Compenent Tracking", Proc. ISARC '99, IAARC, Madrid (1999), pp. 289-294.

(Continued)

Primary Examiner—Eric M Blount

(57) ABSTRACT

A radio frequency identification (RFID) tracking system to track and manage assets. Each asset to be tracked is tagged with an RFID tag, and tracked using RFID readers located throughout a facility. Based on the tracking information, the system allows users to manage assets and generate reports regarding the various tagged assets.

44 Claims, 22 Drawing Sheets

U.S. PATENT DOCUMENTS

| | | | |
|---|---|---|---|
| 2003/0015586 A1* | 1/2003 | Okamura | 235/385 |
| 2003/0120509 A1* | 6/2003 | Bruch et al. | 705/1 |
| 2004/0084525 A1* | 5/2004 | Kreiner et al. | 235/384 |
| 2004/0193449 A1* | 9/2004 | Wildman et al. | 705/2 |
| 2005/0246094 A1* | 11/2005 | Moscatiello | 701/207 |
| 2005/0258956 A1* | 11/2005 | Neuwirth | 340/539.13 |

OTHER PUBLICATIONS

Billibon Yoshimi, "On Sensor Frameworks for Pervasive Systems", IBM T.J. Watson Reearch Lab; 2000.

* cited by examiner

ANTENNA GRID

RFID READER scale: ☐ equals 20 feet

*Proposed Infrastructure Diagram*

Rental Detail Report
02/28/2005 05:14:54 PM

Report Criteria

| | |
|---|---|
| Department(s) | All |
| Equipment Group(s) | All |
| Manufacturer(s) | All |
| Model(s) | All |
| Due Date | All |
| Length Of Rental | |
| From Date | 01/01/2004 12:00:00 AM |
| To Date | 12/31/2004 11:59:59 PM |

Department Name: [ IN BIOMED ] --> Behavioral/Acute/Psychiatry (Dept Id: 40)

| RER No | Equipment Group | Manufacturer | Model | Total Rental Day(s) | Total Rental Cost | Rental Cost Per Day |
|---|---|---|---|---|---|---|
| RERUAN1 | Alarm, refrigerator/freezer | Kendro Laboratory Products | Alarms, Refrigerator [T100-1] | 80 | 3520.00 | 44.00 |
| ALARM1 | Alarm, patient | Philips Medical Systems | Alarms, Occupancy, Bed [M1109A] | 52 | 624.00 | 12.00 |
| ABC123 | Alarm, patient | Philips Medical Systems | Alarms, Occupancy, Bed [M1109A] | 81 | 321.57 | 3.97 |

Group End Department Name: [ IN BIOMED ] --> Behavioral Acute Pyschiatry (Dept Id: 40)

Department Name: [ IN BIOMED ] --> Biomedical Services (Dept Id: 52)

| RER No | Equipment Group | Manufacturer | Model | Total Rental Day(s) | Total Rental Cost | Rental Cost Per Day |
|---|---|---|---|---|---|---|
| TEST061 | Alarm, patient | Philips Medical Systems | Alarms, Occupancy, Bed [M1109A] | 67 | 957.43 | 14.29 |
| AGSTEST061 | Alarm, patient | Augustine Medical Inc Sub Arizant Inc | test | 66 | 6600.00 | 100.00 |

Group End Department Name: [ IN BIOMED ] --> Biomedical Services (Dept Id: 52)

Department Name: [ IN BIOMED ] --> Cardiology (Dept Id: 46)

FIGURE 19

Rental Detail II Report
02/28/2005 05:16:34 PM

Report Criteria

| RER No |
|---|
| ALARM1 |

| RER No | Rental Rate Type Desc | Rental Rate | Rental Order Date | Rental Delivery Date | Expected Return Date | Rental Return Date | Days Over Due |
|---|---|---|---|---|---|---|---|
| ALARM1 | Daily | 12.00 | 10/10/2004 | 10/11/2004 | 10/12/2004 | | 80 |

Report End

Time duration of Report Generation: 0 seconds.

FIGURE 20

RADIO FREQUENCY IDENTIFICATION ASSET MANAGEMENT SYSTEM, AND COMPUTER PROGRAM PRODUCT

CROSS REFERENCE TO RELATED APPLICATION

This application claims priority to U.S. provisional application entitled, "Asset Management System, Apparatus, Method and Computer Program Product," having Ser. No. 60/567,770, filed May 5, 2004, which is entirely incorporated herein by reference.

This application also contains subject matter and is related to copending U.S. utility patent application entitled "Radio Frequency Identification Tag", U.S. utility patent application entitled "Radio Frequency Identification Asset Management System and Method", and U.S. utility patent application entitled "Radio Frequency Identification Asset Management System and Method", filed May 5, 2005, which are entirely incorporated herein by reference.

BACKGROUND OF THE INVENTION

1. Field of the Invention

This invention relates to systems, apparatuses, methods, and computer program products relating to tracking and managing assets, such as medical assets, beverage containers, and manufacturing inventory. More particularly, the invention relates to using radio frequency identification (RFID) tags to track, manage, and maintain mobile and/or portable assets in a medical facility, shipping facility, inventory warehouse, or other similarly configured facility that houses mobile assets.

2. Discussion of the Background

In today's hospitals and medical environments asset management is very important, as hospitals make efforts to streamline operations to reduce overall operation costs. However, currently there are few tools available that allow hospitals to accurately track, maintain and properly distribute medical, and other mobile equipment (e.g., beds, wheelchairs, carts, laptop computers, etc.). Hospitals spend large amounts of funds on various medical supplies and apparatuses, but have few options available to track and manage their assets and ensure that their resources are being used as efficiently as possible.

Similar issues exist in other environments where the business relies on ready-use of mobile assets. For instance in a warehouse environment, various containers are often moved from one location to the next, with some uncertainty arising regarding a present location of a specific container at any given time. As more employees move containers from one location to another, or move groups of containers so as to access a specific container, the likelihood of a container being misplaced increases.

Applications of RFID technology are wide ranging and include detecting objects as they pass near to a sensor, uniquely identifying a specific tag and associated asset, and placing data relating to the tag into an RFID reader for later recovery. The process of reading and communicating with an RFID tag generally includes bringing the tag in proximity to an RFID sensor. Typically the RFID tags are active tags with an internal power source and emit a constant RF signal (or alternatively pulsed beacon). The RFID readers then detect the tag's emitted RF signal when the signal is within the range of the reader's emitted RF field (or receive range), and the readers receive and process the RF signal emitted by the tags. Thus, the reader detects the presence of an RFID tag by detecting its RF signal, and processes the received RF signal to accurately determine the unique identification code of the tag.

Alternatively, in other conventional systems, the RFID tags are passive until illuminated by the radio frequency field of the RFID sensor, at which point they become active. The RFID tag detects the presence of the field of the reader, and subsequently activates to send data, using various forms or protocols of hand shake occur between the tag and the reader, in order to exchange data. All of this communication between the tag's transponder and the sensor is performed using radio frequency energy of some kind. When multiple RFID tags are involved, anti-collision protocols are employed in order to multiplex or provide multiple accesses to the readers by the multiple tags. The main advantages of an RFID sensor and transponder system over the other forms of RFID tagging include (i) communication can occur within comparatively harsh operating environments; and (ii) the communication range between the sensor and transponder can be significant even when the RF frequencies are within the power limitations of the Federal Communications Commission (FCC) rules concerning unlicensed transmitters.

Accordingly, RFID technology is useful for several applications, especially those relating to security and asset management. For example, in an application where enhanced security is desired, RFID systems using electromagnetic energy with very low frequency are attractive since the very low frequency energy tends to suffer low losses from shielding materials such as metal boxes, aluminum foil, curtains, and the like. Those who would surreptitiously remove the tagged assets from a building usually try to use such shielding techniques. However, these low frequencies typically require large antennas with a transponder in order to achieve reasonable levels of RF coupling between the reader and the tag. It is impractical to place large wire antennas within small tags; accordingly, comparatively small magnetic loop antennas are the coupling methods of choice for such small tags. These magnetic loop antennas exhibit a serious drawback, however, in that they have characteristic "figure-8" sensitivity pattern and, in certain positions and/or orientations, can reject or otherwise not detect the fields generated from the sensor. Stated differently, magnetic loop antenna of the tag can only receive energy from the reader antenna coils only when the orientation of the reader and tag coils is similar. Specifically, the "rejection" solid angle for a loop antenna could be thought of as a band of a certain solid angle measured from the center and oriented 360° around the circumference of the loop. When such rejection occurs, the tag may be well within the sensor's intended field, but fails to detect the tag's emissions, and therefore also fails to communicate therewith. A related problem is when the position and/or orientation of the reader within the field is varied, thereby taking the readers out of the "figure-8" pattern of the tag antenna, and interrupting communication between the reader and tag.

Additionally, many existing RFID tag/reader systems do not have the ability to locate the tag in 3-dimensional space. As recognized by the present inventors, those that do have this ability suffer from significant drawbacks and some of them function using the low frequency signals needed to pass through foil and other shielding. The added capability of the spatial positioning, however, allows the reader to gather more information about the tag, i.e., its relative spatial location with respect to the sensor or some other reference point. This capability provides a very significant advantage over other asset management systems (RFID or otherwise) which cannot determine the position of the assets.

Other prior art asset tracking systems have been implemented using RFID tag readers with consistent, similar antenna pattern designs. This design, however, requires the use of triangulation techniques in an attempt to pinpoint the exact location of a specific asset or RFID tag. These systems fail to have the precision needed to detect that an RFID tag is on a specific floor, or that the tag is located in a specific room if readers are located in two adjacent rooms. In a system with poor tracking fidelity, tracking the assets using software proves to be difficult because the exact location of the tag can not be determined to the precision required by the tacking software.

Conventional systems have also implemented infrared IR detection systems to perform asset tracking functions, however the present inventors recognized a drawback to implementing such a system is that the reader and the IR tag must be in visual range of one another for the tag to be properly read. Thus, assets can be easily moved without being detected by the IR tag reader, making accurate asset tracking difficult.

Additionally, the conventional systems described above include RFID tags of various elongated shapes, which are not always compatible with the various assets that are to be tracked. Specifically, difficulties are encountered with large RFID tags are to be attached to small devices and therefore make using the small device awkward and cumbersome. Also, as discussed above, the various tag designs cause the RF field emitted from the tag to be non-uniform and thus dependent upon the orientation of the tag for detection.

Furthermore, such conventional systems fail to be supported by sufficient software systems that manage, track and allow maintenance of the assets including the RFID tags. The conventional systems allow the assets to be tracked; however they do not provide specialized functionality for the hospital environment.

SUMMARY OF THE INVENTION

The present invention addresses and resolves the above-identified, as well as other limitations, with conventional RFID asset tracking systems. The present invention provides a comprehensive asset tracking software infrastructure, and RFID hardware technology for asset tracking. The present invention includes a software-based asset management system and hardware solution that enables users to effectively support efficient distribution of assets, such as medical assets or shipping crates.

One aspect of the present invention provides a zonal approach to the tracking of RFID assets. By using RFID hardware, related software, and specialized antennas in a unique way, the system provides an RFID resolution that is more accurate than conventional approaches, while providing the broadest RFID coverage within a hospital setting. The system uses improved RFID tag readers, which allow for a customized antenna pattern, thus improving the resolution needed to accurately track the location of assets.

The system also utilizes a "cube" design for an RFID tag, which reduces the physical footprint of the tag, as compared to conventional active RFID tagging systems. This RFID tag also exhibits improved RF capabilities over the conventional devices by emitting a consistent antenna pattern around the circumference of the RFID tag. This approach reduces the "dead spots" in the RF field surrounding the tag, and allows the RFID tag to be detected similarly, regardless of its orientation. Other tag designs may be utilized, with that also emit a consistent antenna pattern.

The improved performance of the RFID reader and tag allows a hospital facility to be segmented into zones corresponding to logical and physical separations within the facility. These zones can be relatively small areas, such as a utility closet, or large areas such as a facility lobby. Each of these areas is set up using an RFID reader which has both an antenna to communicate with the RFID tags and an antenna to communicate with a wireless fidelity Wi-Fi access point. The antenna used to communicate with the RFID tags can be shaped in various configurations to appropriately cover a specified area, thus allowing for the various zones to be created. The RFID reader uses the Wi-Fi antenna to communicate with the Wi-Fi access point. The Wi-Fi access point is then configured to be connected to the hospital network allowing for the asset tracking software to manage the mobile RFID assets. The RFID tag reader is also able to be optionally connected to the hospital network via an alternative network connection. For example an Ethernet connection (FDDI, Firewire) or any other similar connection may be used to allow for the RFID tag reader to communicate to the hospital network.

Another approach consistent with the inventive aspects of the system is to create RFID signposts to distinguish one zone from another. These RFID devices are used at portals (i.e. doors and elevators) to identify that the tag has entered the field of that device. The RFID tags used operate with a dual frequency, 433 MHz and 307 KHz. When the tag enters a field the device communicates to the tag at the 307 KHz, the tag then sends the message (updated location) via the 433 MHz frequency. With this approach the facility is still segmented into zones, and in effect, the portal devices take the place of the antennas.

As discussed, prior concepts utilize triangulation for positioning, which can only provide general resolution (accuracy within x feet depending on receiver density with multiple variables impacting accuracy). The zone approach requires discrete resolution—is it in this zone (or room). The ability to track to the zone level facilitates the inventory management capability of the system, because the system knows if a device is inside of the four walls of a utility closet, for example. Knowing that the device is in the proximity of the closet is not sufficient. Note that these devices can utilize Wi-Fi networks for communication, but can also be connected via Ethernet.

The software-based asset management system provides users with the ability to track the states of assets including available for use, in use, soiled or out of use, or out of service. Users of the system are also able to track all movements within a facility between facilities of particular assets, and also assess whether assets are moving or not moving. Multi-attribute searches can be performed in order to find a specific asset. The software is also a web-based, hosted, tracking solution for asset tracking needs. The software has also been written to be accessible via a PDA device. This is a unique advantage of the system because it combines true mobility for support workers in managing mobile devices. No other RFID-enabled asset tracking solution provides handheld functionality.

Complicated equipment requisition, distribution, and fulfillment tasks related to the various assets can also be performed by the present invention. Some of the capabilities of the system that assist in this functionality include integrated requisition work flow functionality including ad-hoc equipment requisition, standing orders for equipment, and tracking of equipment requests. Also, proactive equipment replenishment and staging based on demand can be automated so that various assets may be reordered or relocated. Various other advantages provided by the software system will become apparent in the following detailed description of the invention. The present invention also presents a unique business process that is enabled and supported by the abovementioned hardware and software attributes. The functionality of the system streamlines and automates several equipment management business processes. The system allows for the development of a business model that ensures compliance with regulatory procedures, automatically identifies equipment requirements, streamlines equipment requisition and workflow, and minimizes manual search activity.

Part of this process includes the streamlining of inventory management functions. Various data generated from the tracking of the assets can be used to determine the most efficient use of the assets. Hospital census data, equipment usage duration, supply data, all well as many other parameters generates by the system is analyzed to determine the most efficient use of the assets available to the facility. Furthermore, the results of the analysis of the data can be used to advise the facility of future equipment purchases and equipment usage trends during specific times of the year.

The descriptions and examples in the following specification are generally directed to an implementation of the RFID tracking system in a hospital, or other medical setting. However, the invention is not so limited. The system and methods described in the context of a medical setting are equally applicable in a variety of other settings, such as in warehouses, trucks, railcars, apartment buildings and condominiums, households, etc. Moreover, the system may be implemented in other similarly configured non-medical facilities to track, manage or maintain non-medical mobile or portable assets. Likewise, the invention may be applicable in other settings where the "mobile assets" are people. For instance, the system may be used to track hospital personnel (e.g., doctors, nurses), visitors and patients. The system may be used to track the movements of people in certain areas where they may not be authorized to visit, or patients who may not be authorized to check out of the hospital. Likewise, the system has equal applicability in a prison setting (or other confinement center) to help keep track of the present location of prisoners, or even in a day-care setting to help keep track of mobile toddlers.

BRIEF DESCRIPTION OF THE DRAWINGS

A more complete appreciation of the present invention and many of the attendant advantages thereof is readily obtained as the same becomes better understood by reference to the following detailed descriptions and accompanying drawings, wherein:

FIGS. 16-21 are screen-shots of the rental tracking interface of the system according to one embodiment of the present invention.

DETAILED DESCRIPTION OF THE INVENTION

Figure 1:
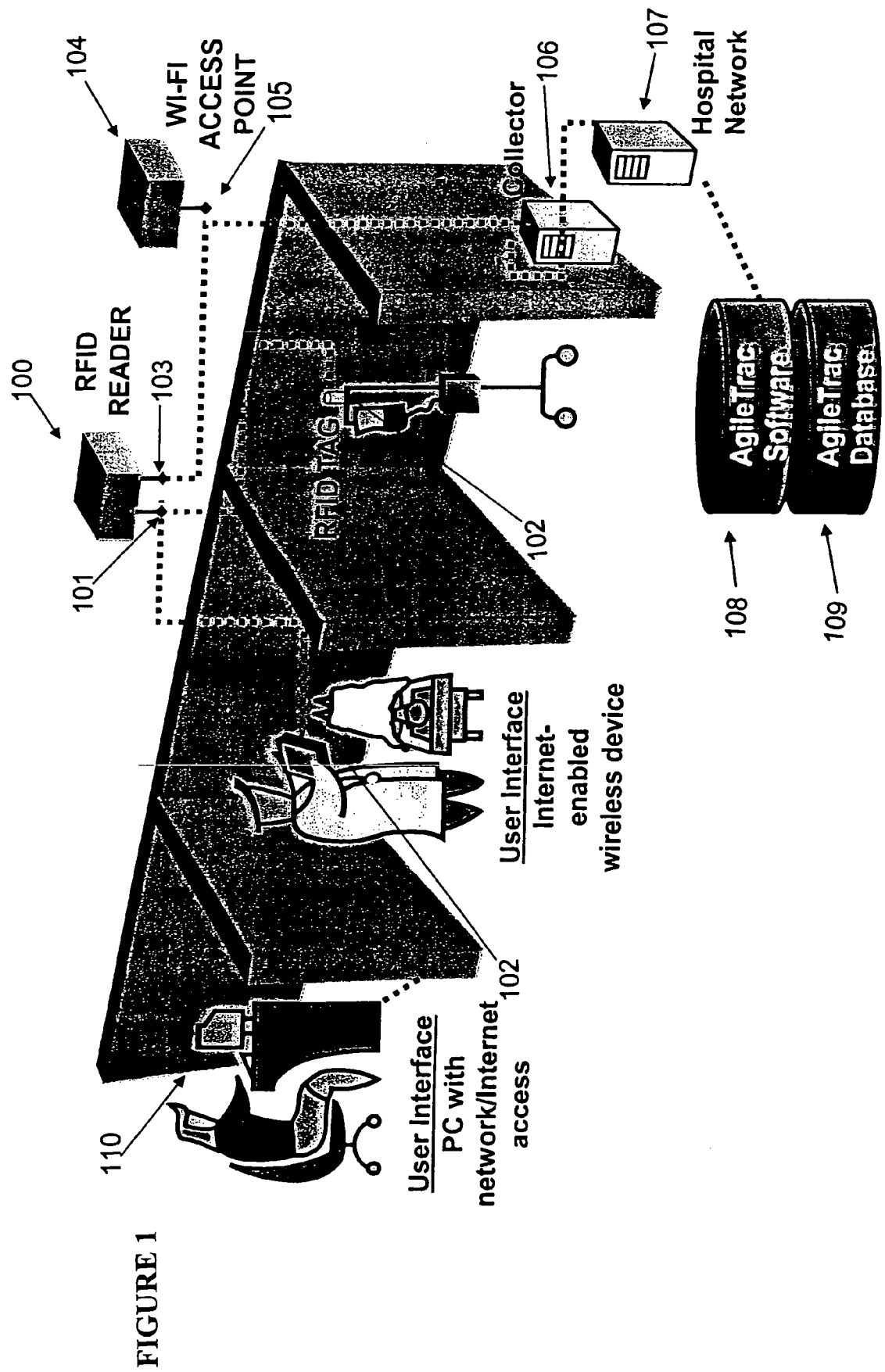
FIG. 1 is a diagram illustrating the overall system configuration according to one embodiment of the present invention.

The following comments relate to the drawings, wherein like reference numerals designate identical or corresponding parts throughout the several views.

FIG. 1 illustrates an overview of hardware that may be used to implement the RFID tracking system according to the present invention. The system includes an RFID reader 100 including an antenna device 101 for communicating with RFID tags (or simply "tag") 102 and internet enabled wireless devices 111, and an antenna device 103 for communicating with a Wi-Fi access point 104. The antenna on the Wi-Fi access point 105 transmits information obtained from the RFID reader 100 to a collector 106, which forwards the collected information onto the hospital network 107. Once the information is forwarded to the hospital network 107, the system software 108 in conjunction with the system database 109, can be used to manage the assets of the system. A personal computer (PC) 110 may also be provided which has access to the hospital network 107, and allows a user to view the information using the system software 108 and system database 109.

The RFID reader 100 includes a processor, which is able to communicate with the RFID tag 102 by performing wireless data processing protocols of the type well understood in the data processing arts. The RFID tag reader 100 communicates with the RFID tag 102, and obtains tag-specific identification information which is processed by the RFID reader 100. It should be noted that both the RFID tag reader 100, as well as the RFID tag 102 are active devices which, when powered, emit an RF signal. Thus, when the RF field of an RFID tag 102 is in the presence of the RF field of an RFID reader 100, the devices perform a handshake operation during which the RFID reader is able to exchange data with the RFID tag. Because of the active nature of the tag, the RFID reader is also able to optionally track the direction that the tag is moving based on the received signal strength of subsequent signal transmissions from the RFID tag. Optionally, the antenna patterns of the receive antennas may be used to geo-locate the RFID tag.

Figure 2:
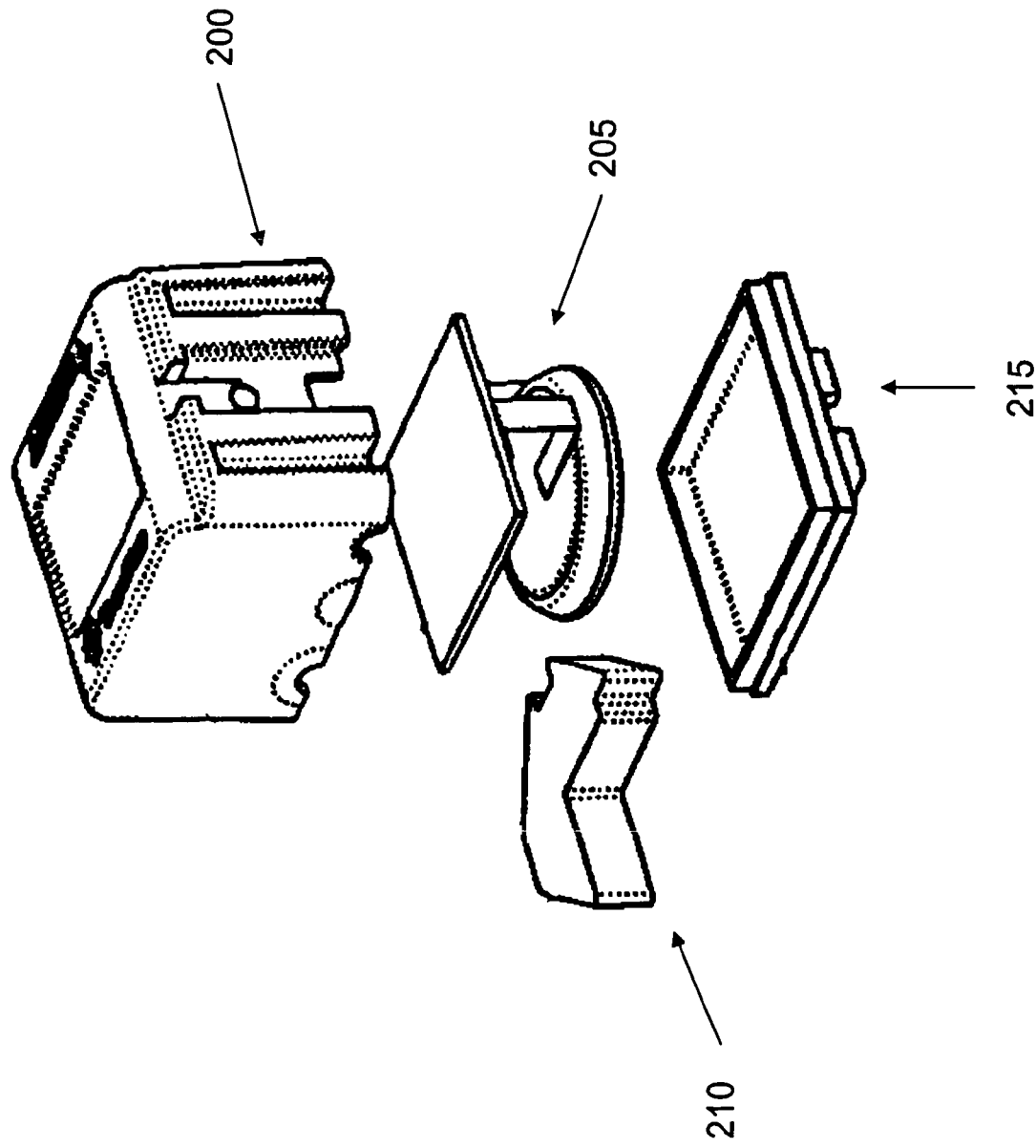
FIG. 2 illustrates the RFID tag according to one embodiment of the present invention.

FIGS. 2-7 illustrate the RFID tag 102 design which may be placed on various devices, apparatuses, or medical equipment allowing the medical equipment to be tracked using the RFID tag reader 100. The basic RFID tag design includes a top shell 200, and an RF module 205. The RF module 205 is described in greater detail in reference to FIG. 3. A foam portion 210 is provided within the RF module 205, and a bottom cover 215 is provided to enclose the RF module 205 within the shell 200. As depicted in FIG. 2, the bottom portion of the cover 215, and a side surface of the shell 200 include a track structure that allow the RFID tag to be attached to a base, such as the base 500 depicted in FIG. 5, as will be discussed below.

Figure 5:
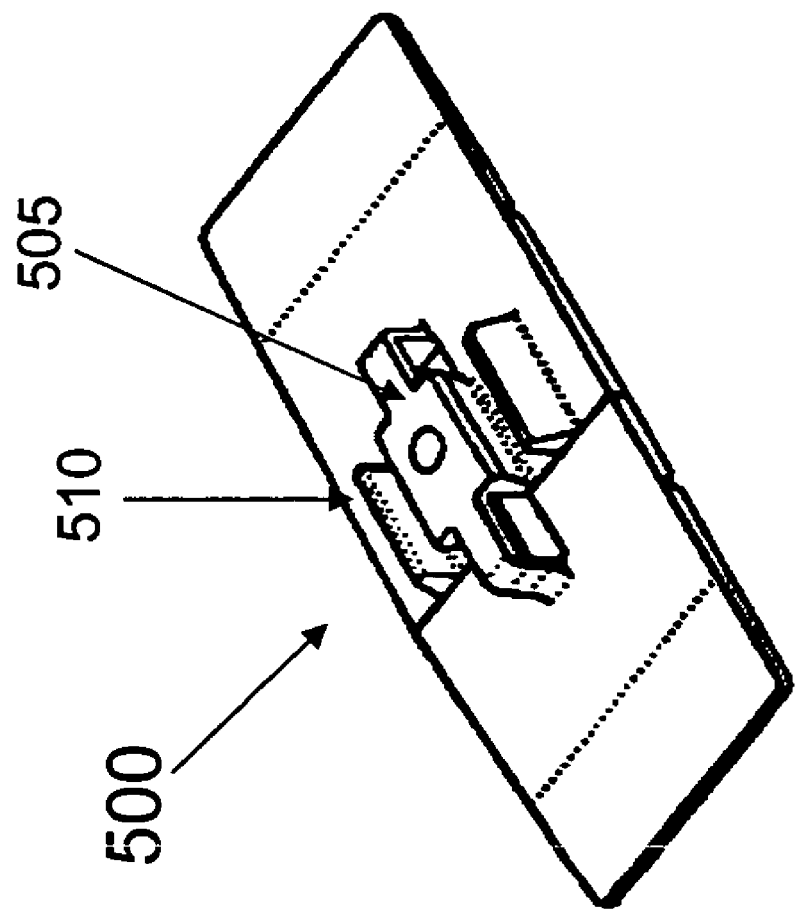
FIG. 5 illustrates a base on which the RFID tag may be mounted according to one embodiment of the present invention.
Figure 6:
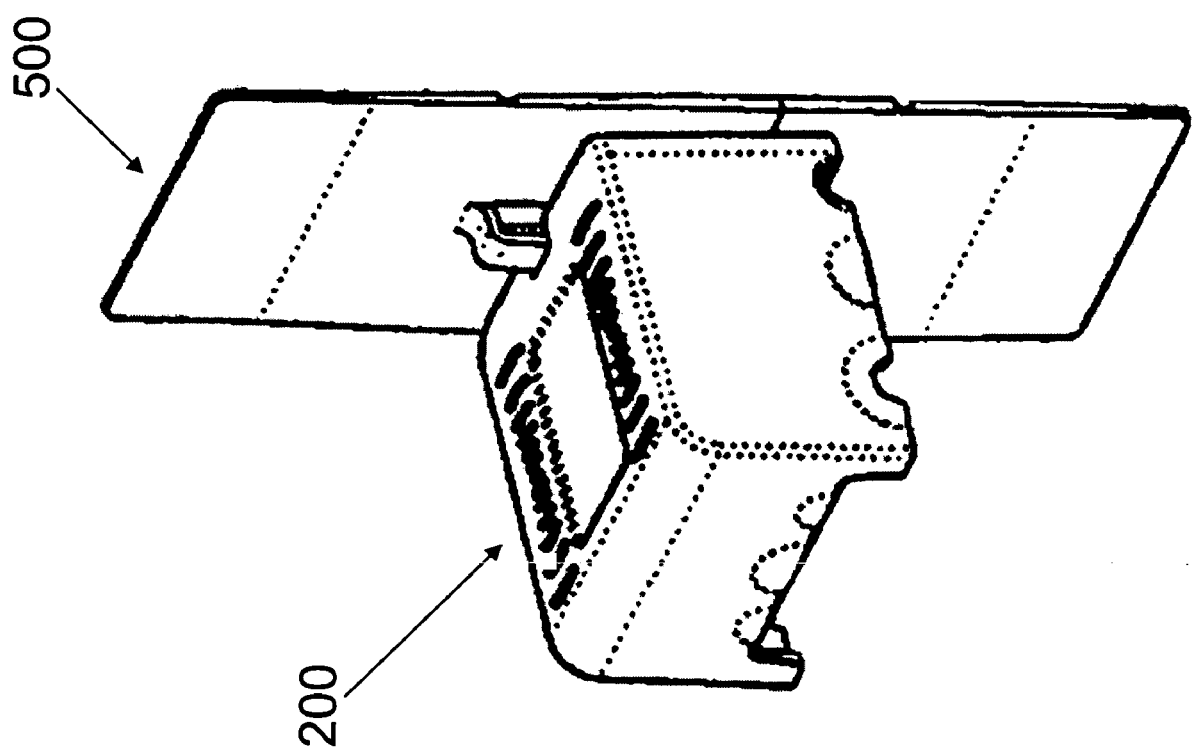
FIG. 6 illustrates the RFID tag as mounted on the base by a side surface of the RFID tag according to one embodiment of the present invention.
Figure 7:
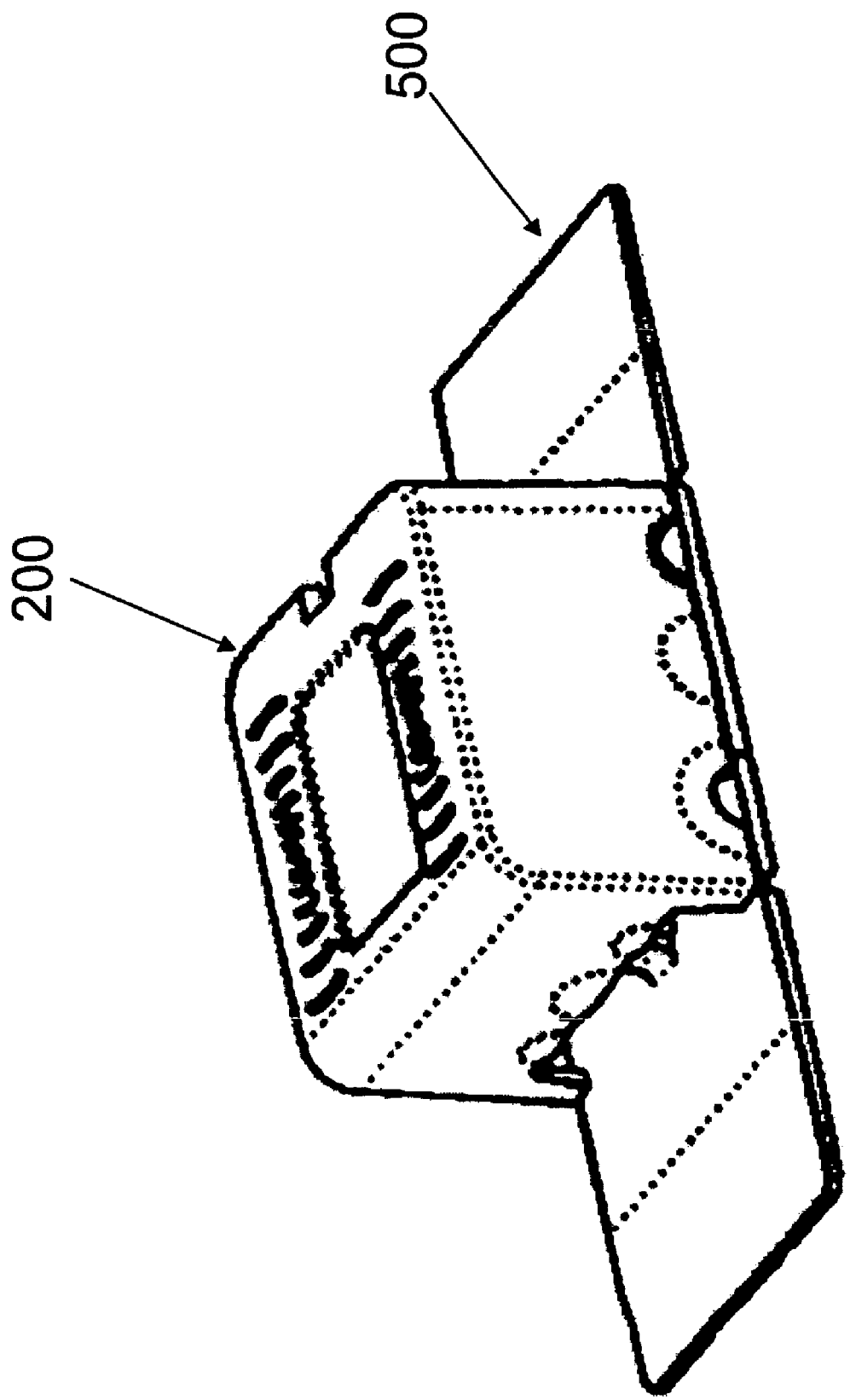
FIG. 7 illustrates the RFID tag as mounted on the base by a bottom cover of the RFID tag according to one embodiment of the present invention.
Figure 8:
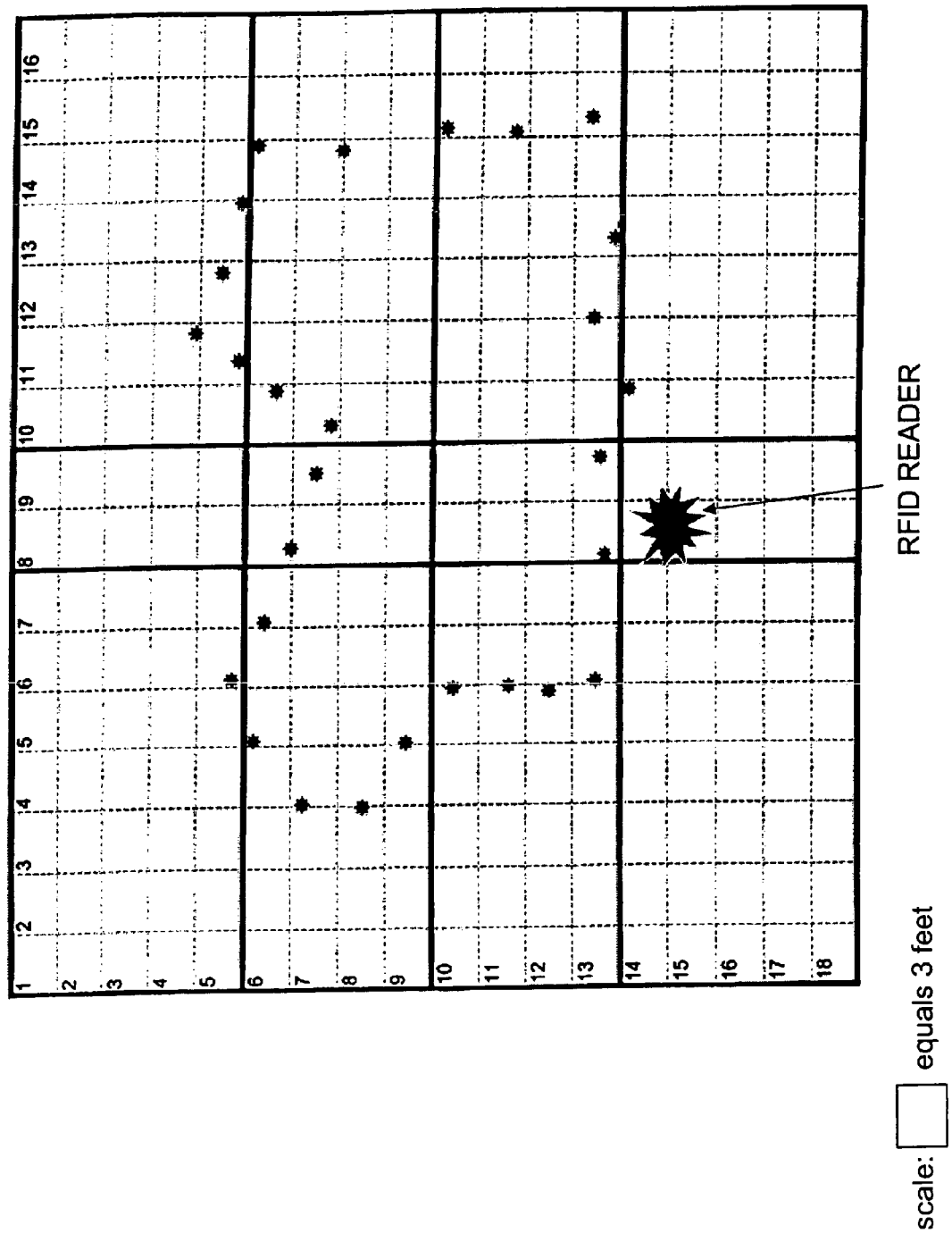
FIGS. 8-11 illustrate exemplary electromagnetic fields created by the antenna of the RFID reader.
Figure 9:
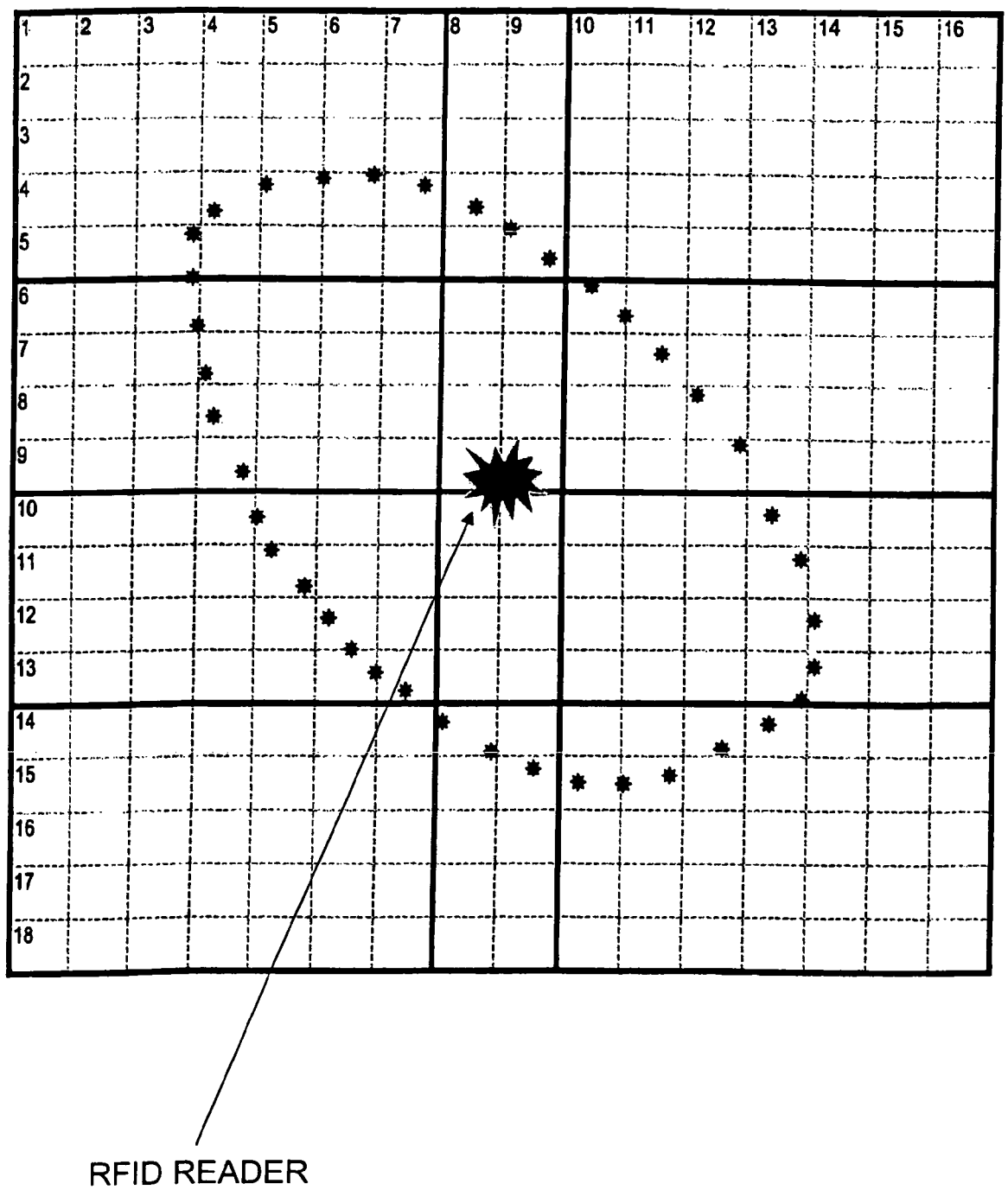
Figure 10:
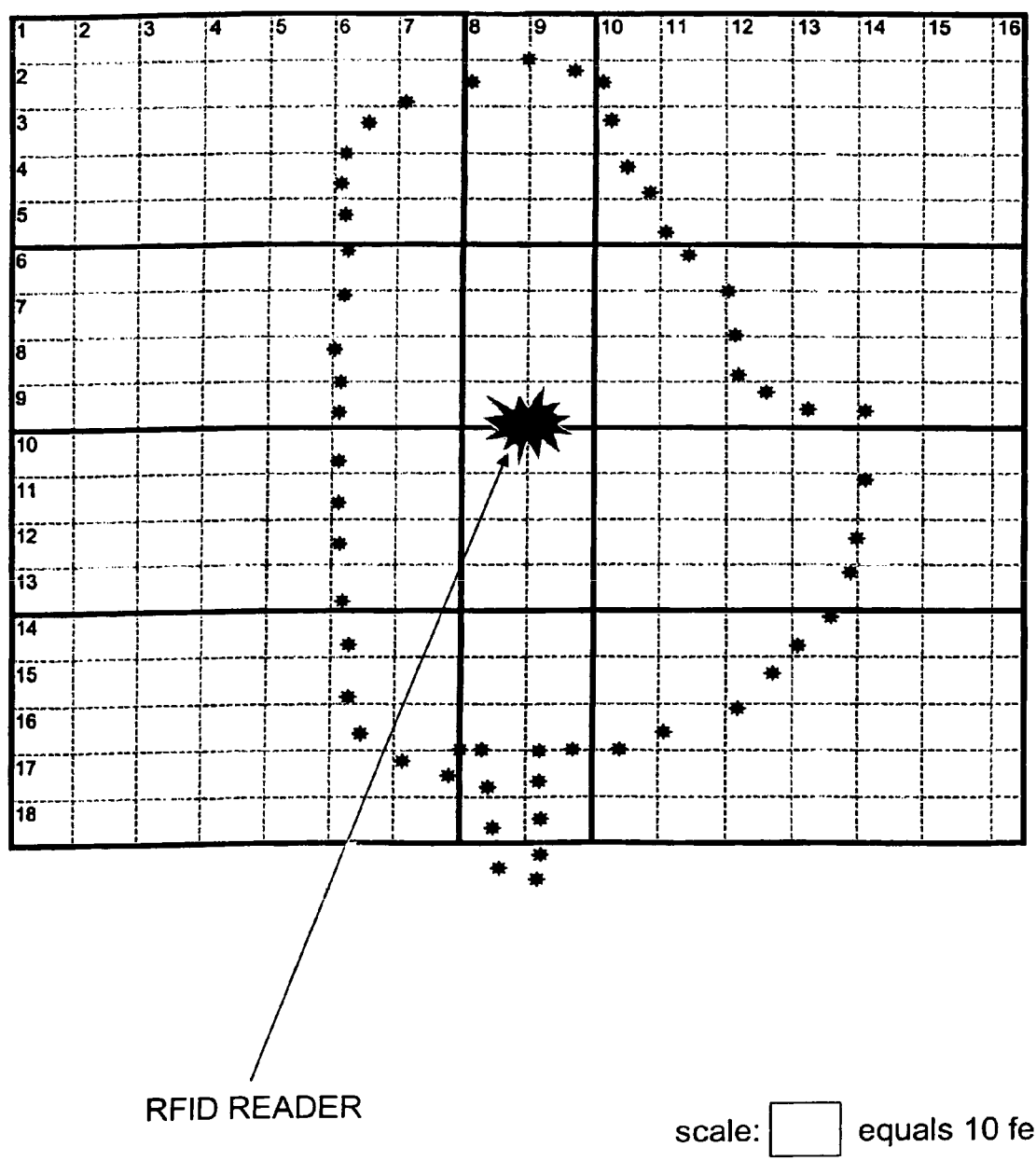
Figure 11:
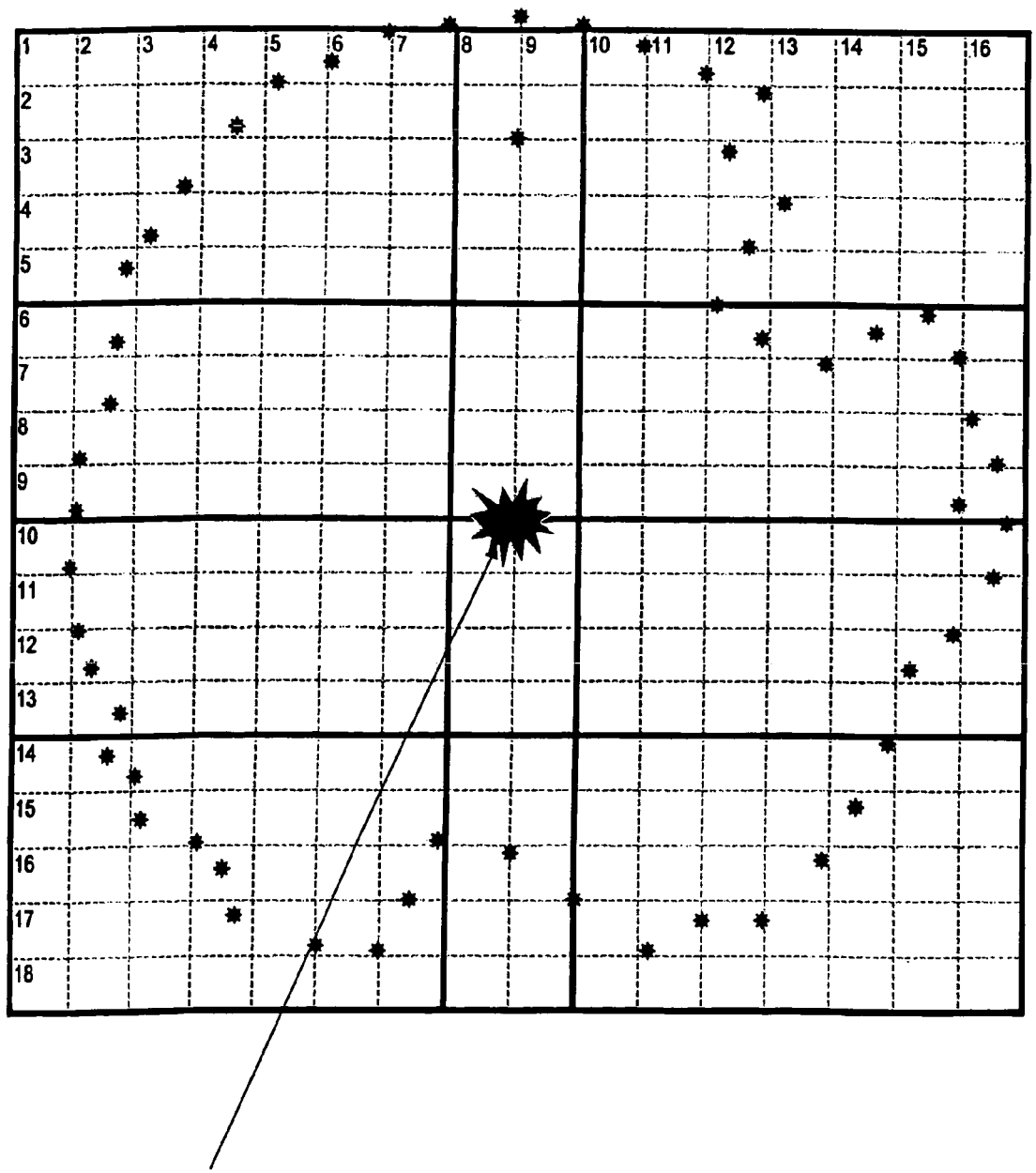

The RFID tag is manufactured to provide a very small physical footprint compared to other active RFID tags. The small footprint tag facilitates tagging of medical devices with the least amount of physical intrusion as possible and is able to be mounted on devices in various ways. The tag may physically be attached using adhesive, or may be mounted on a specifically manufactured mounting base device 500, as depicted in FIGS. 5-7. The mounting base 500 can also be attached to the devices by adhesive, cable or any other means available. Cable can also be run through the RFID cube casing to secure the RFID tag to a device if attaching the tag with adhesive is not practical.

Figure 3:
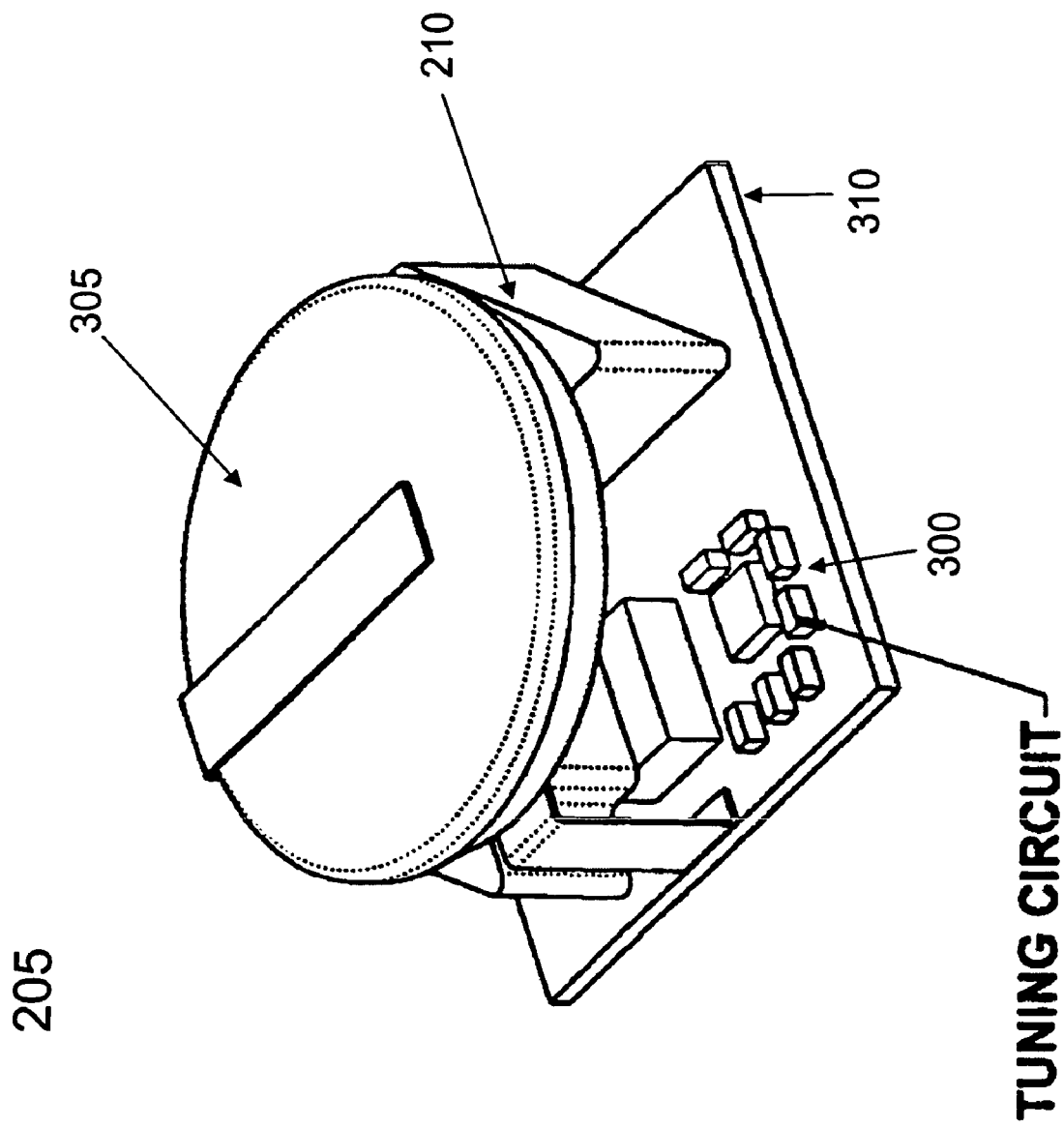
FIG. 3 illustrates the RF module included as part of the RFID tag according to one embodiment of the present invention.

As depicted in FIG. 3, the RFID tag 102 includes an RF module 205 which includes a tuning circuit 300 for tuning the transponder 305, and for facilitating wireless protocol communications with the RFID tag reader. The RFID tag may be programmed using the tuning circuit 300 to emit a specific identification code using an RF signal at a specified power level. The variation in power level is useful for implementing the system in a confined building space as discussed below. As discussed above, a foam pad 210 is also provided between the transponder 305 and the base 310 of the RF mechanism. The foam pad 210 assists in shock absorption and heat dissipation of the RF module 205.

Each of the RFID tags 102 are assigned an individual ID corresponding to the device on which each respective tag is placed. These identification codes may be assigned to various RFID tags and marked in the system database as corresponding to the device on which they are attached. One method of assigning the RFID tags to various devices includes using a handheld device which is linked to the hospital network via the Wi-Fi access point. In this configuration, a system administrator can use the hand-held device to individually assign a unique RFID tag and identification code to each asset that is to be tracked and/or managed in the hospital. The devices can also be assigned a code and a unique RFID tag by using a PC that is interfaced to the system software and database.

The hardware used to implement the RF portion of the system is derived from commercial off-the-shelf products such as those described in U.S. Pat. Nos. 6,340,932, 6,621, 410, 6,552,661, 6,362,737, and 6,351,215 which are entirely incorporated herein by reference.

The tag is typically powered by way of a battery. However, the tag could also be powered via a power source of the equipment to which it is attached. In this manner, the tag could be configured to have an input for a power source, and the medical device to which it is attached would include an output for supplying power to the RFID tag. Relying upon an alternative power source would prevent the tags from having to be replaced upon the depletion of the battery power supply.

The tag could also include a tamper indicator, such that when a tag is affixed to a device, a pin that protrudes from the tag is depressed. If the tag is removed, the pin is released and a message is sent to the host system that the tag has been removed.

An advantage of the RFID tag design is that the signals emitted from the device provide a consistent signal pattern. The RFID tag emits a substantially spherical RF signal pattern that allows the RFID tag to be oriented in any direction while still providing a consistent antenna pattern. Because of the consistent emission of the RF signals from the tag, the system is able to provide better location detection resolution, and thus have greater reliability.

Figure 4:
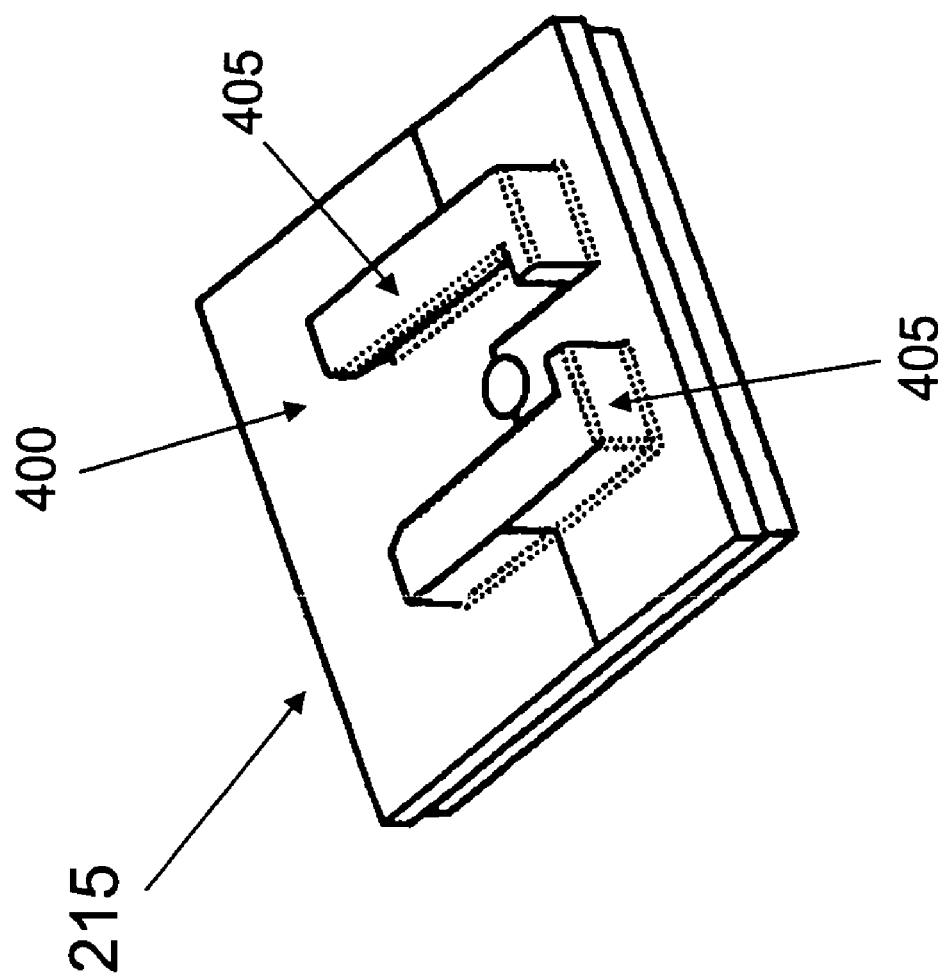
FIG. 4 illustrates a bottom cover of the RFID tag that includes a mounting structure to be mounted to a base.

FIG. 4 shows an expanded view of the bottom surface of the cover 215 that encloses the bottom opening of the RFID shell 102. Specifically, FIG. 4 provides a detailed view of the pattern created on the bottom portion of the cover 215, which allows the RFID tag 102 to be mounted to the base 500, depicted in FIG. 5. The cover 215 includes a plurality of rails 405 which clip onto the inside rail 505 of the base 500, a plurality of support rails 510 are provided on the base structure 500 to support the RFID tag in its position. The plurality of rails 405 are shaped so that the cover 215 can be securely fastened to the base 500. A similar structure is also provided on a side surface of the shell 200, allowing the cube to be attached to the base 500 by way of either the cover 215, or the side surface of the shell 200, which has a similar structural configuration as the bottom surface of cover 215. FIG. 6 depicts the configuration wherein the shell 200 is attached to the base 500 by a side surface. Alternatively, FIG. 7 depicts an embodiment where the shell 200, is attached to the base 500 by way of the bottom surface of the cover 215.

FIGS. 8-11 illustrate exemplary antenna patterns which may be emitted from each RFID tag reader 100, via the antenna configured to read the RFID tags 101. These antenna patterns can be customized so that the range can be narrowed or expanded to cover various three-dimensional areas or spaces in a hospital setting. This invention is in no way limited to the antenna patterns described in FIGS. 8-11, as various other antenna patterns may be employed to improve the precision and dependability of the system. The antenna patterns are able to be customized in such a manner that allows spaces such as closets, bins, rooms, or large open areas to be covered by the RFID tag reader antenna 101. Furthermore, power of the signal emitted from the RFID reader is configurable so that the reader can be customized to limit the RF field of the reader and only detect tags in a predefined area.

The design of the particular building is also taken into consideration when determining the optimal locations of the RFID readers. Thus, the walls of a building and wall's specific make up (e.g. concrete, curtain, etc.) can be taken into account when determining how to best locate the RFID tag readers to detect tags from a specific room.

Figure 12:
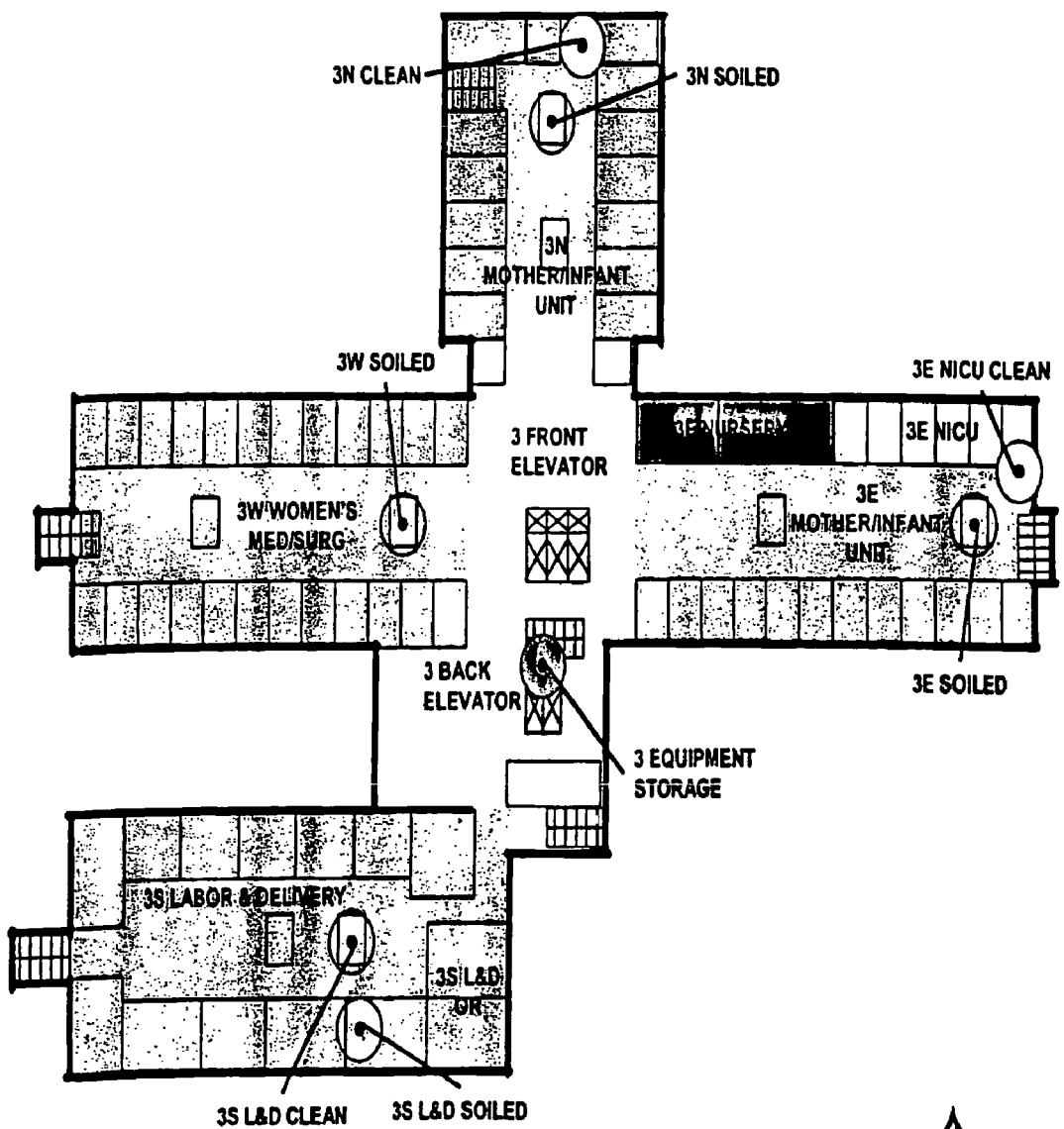
FIG. 12 illustrates an exemplary zonal approach employed by one embodiment of the present invention.

FIG. 12 illustrates an example of a zonal approach which allows the system to accurately track tagged assets based on the location of RFID tag readers. As illustrated in FIG. 12 the various sectors of a hospital are assigned a specific zone, with each zone including an RFID tag reader 100. An RFID tag 102 may be located in each and every zone of the hospital floor so that the assets may be tracked accordingly. When an RFID tag enters or exits a specific zone, it is read by a new RFID tag reader that is able to update the location of the tracked asset.

As described above, the structure of the setting in which the RFID tag readers are implemented may dictate the design of the system and the setting of the RFID tag readers. For example, if the reader is assigned to a specific bin, which serves as a receptacle for assets requiring cleaning, then the RFID tag reader may emit a low intensity, narrow signal. However, if the RFID reader is assigned to track all assets in a long, narrow corridor, then the power setting of the reader may be high, and the antenna pattern emitted by the RFID reader would be customized to fit the design of the corridor. The walls or other structures in the facility may also be used as barriers for the RFID signal fields to help separate one zone from another.

As depicted in FIG. 1, when the information is read from the tag by the RFID reader, the tag identification information is transmitted to the Wi-Fi access point, which forwards the information onto a collector 106, the collector may be a server or any other suitable substitute. The tag identification information is then transmitted from the collector to the hospital network. Once in the network, the tag location and identification information are accessible to the system software and database for further processing, as described below.

A handheld RFID reader is also available which allows a user to dynamically set the range of the reader. For example, the reader can be set to read tags from a 30 foot range to a 12 inch range. The user can take an inventory of tags in a range and upload this to the system via the handheld device in real-time, if wireless networking is available. Alternatively, the inventory could be captured and uploaded to the system via a synchronizing process at a work station. Additionally, users can enter a specific asset number on the handheld and the handheld will only locate the corresponding tag when the tag is in range of the handheld device. Such a handheld may also be used to dynamically upload data into the system.

The following fields are output from the RF code software identified above, and input into the data server. "RFID tag", the first six characters of the ID is the group code and the last eight characters of the ID is the actual tag ID. "Scan date", is the date the ping information was picked up. The date is converted to GMT before it is passed to the database. Format of the date is "DD/MM/YYYYhh:mm:ss." The date is sent to the data server in GMT time zone. "Scan area", the area from which, or to which, the asset has moved. The area code sent to the database is the area code that is stored in the data server and in the system database. This means that the database codes are stored on the RF side. "Reader ID", the unique reader identifier. "Exception scan", this is a flag column that has one of the following multiple values: 1=in scan, 2=no scan. The "no scan" status indicates that the asset has not been "seen" for "x" period of time, where "x" is configurable. "x" is stored on the RF code side and a late scan is determined and sent by the RF software.

Figure 13:
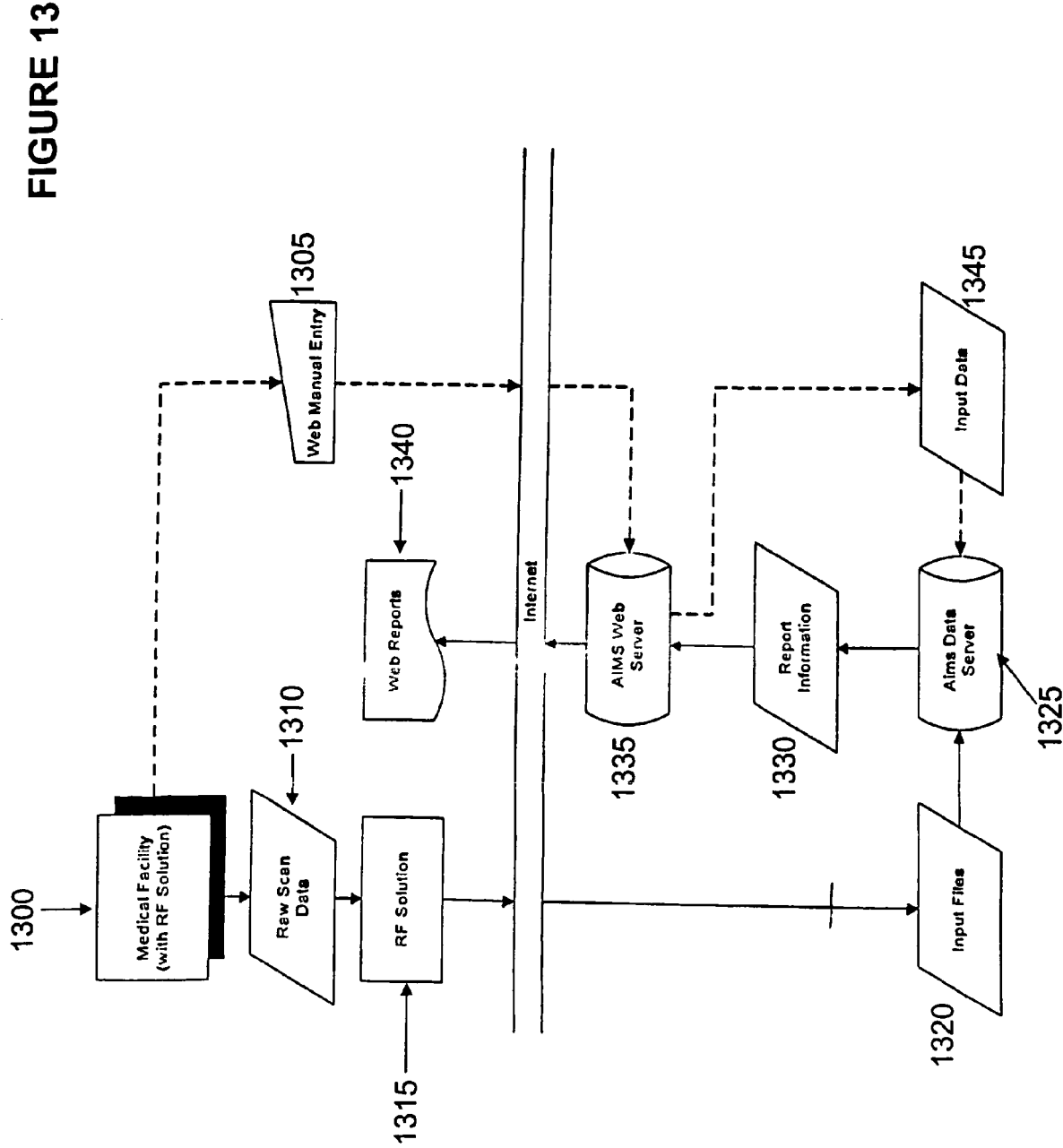
FIG. 13 illustrates a high-level view of asset tracking data flow according to one embodiment of the present invention.

FIG. 13 illustrates an exemplary overview of the information flow in the system. The system is set-up by tagging each asset to be tracked with an RFID tag containing a specific code. The unique RFID tag code is entered into a database and is relationally linked with the asset to which it is attached. The database then maintains communication with the RFID collector and associated system so that the assets may be tracked via the attached RFID tags.

gives the user autonomy so that each asset could be tagged at its current location, and the tag and asset information could be transmitted to the system database over the Wi-Fi wireless network. The hand-held device could also store the correlation information to its local memory, and then download the information to a computer or server connected to the network.

Once the correlation information is stored into the database, the asset can be tracked based on the RFID tag to which is corresponds. This correlation information could be updated and altered based on changes in equipment or replacement of IF tags by way of the RFID tag assignment methods discussed above.

Also depicted in FIG. 13 is the flow of information that takes place through the components of the system. The system is implemented in a facility, outfitted with the RFID tracking system hardware discussed above 1300. The RFID hardware provides raw data 1310 in the form of tag identification codes and other specified parameters, as discussed above, to the other portion of the RF solution 1315. The information is then transmitted 1320, via the hospital network to a data server 1325. Based on the data, report information is conditioned 1330 and sent to the web server 1335. This information is then accessible to various users in the form of sortable database results and customized tracking reports 1340 via a web based interface, as discussed below.

FIG. 13, also depicts the process of manually inputting of the correlation between the tags and the assets to be tracked, as discussed above. The user is able to directly input the data 1305 to the web server 1335 via the handheld device or a PC connected via network to the system database. When the information is input directly to the web server 1335, the web server updates 1345 the data server 1325 with the information that as manually input by the user.

Figure 14:
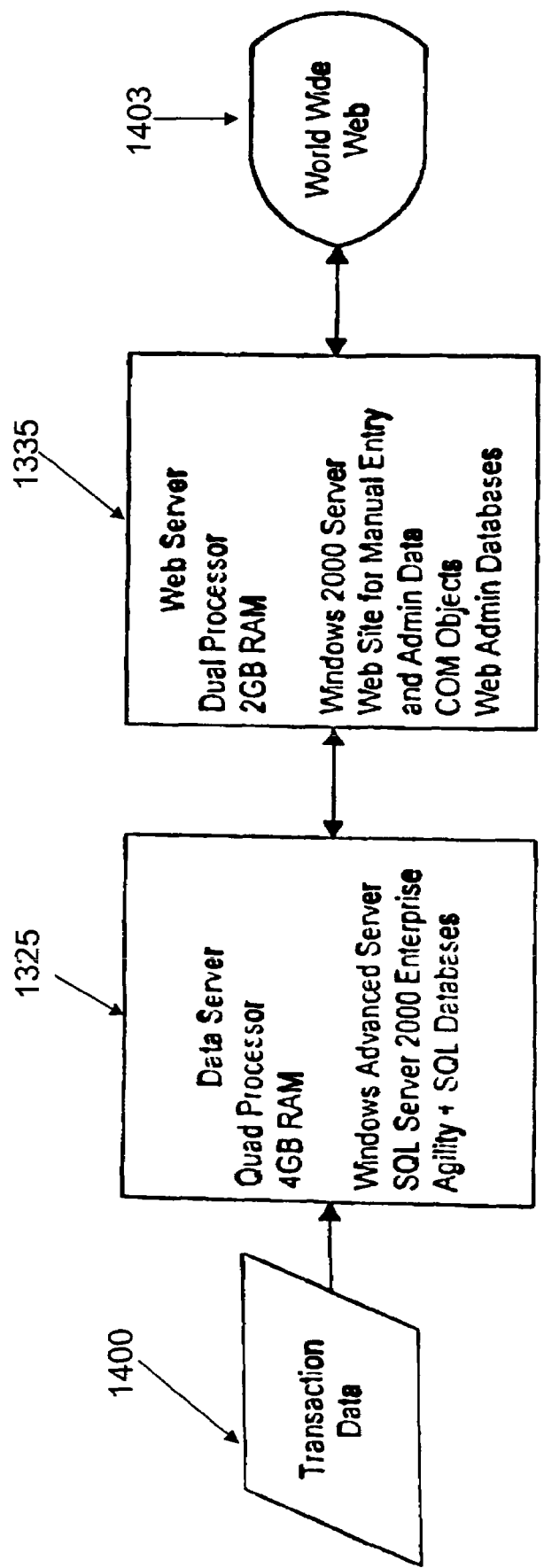
FIG. 14 shows the data flow and hardware components in the data server and web server according to one embodiment of the present invention.

FIG. 14 provides an overview of the hardware and software infrastructure used for the data server 1325 and web server 1335. The transaction data 1400 generated by the RF hardware infrastructure is received by a data server, and is in the form of raw data described above. The data server 1325, is a quad processor with 4 GB RAM and includes appropriate software, such as Windows advanced Server, SQL Server 2000 enterprise, and other system specific databases.

TABLE 1

| | Data Server Hardware Configuration | | | | | | |
|---|---|---|---|---|---|---|---|
| Used By | OS + SW | SWAP File | SQL Data | SQL Log | Temp Data | Temp Log + Backup | Total |
| RAID Configuration | RAID 1 | RAID 1 | RAID 1 + 0 | RAID 1 | None | None | |
| Storage Location | Server | Server | Server | Server | Server | Server | |
| Disk Size (GB) | 36 | 36 | 36 | 36 | 18 | 36 | |
| Number Of Disks | 2 | 2 | 4 | 2 | 1 | 1 | 12 Disks |
| Disk Speed | 15000 | 15000 | 15000 | 15000 | 15000 | 15000 | |
| Total Data Space | 36 | 36 | 72 | 36 | 18 | 36 | |

One approach used to associate each of the tags with their corresponding asset is to manually input the information 1305. Specifically, a user is able to tag a specific asset then enter the tag identification information and the asset to which the tag corresponds using a web-based interface. The information is then stored to the system database 1325 and the tag and asset can successfully be tracked.

An alternative approach is to use a hand-held device to enter the information manually. Using a handheld device The data server's purpose is to receive all tag information transferred from the medical facility and validate this information to ensure data integrity. The data server also transfers the information to a reporting database for use by system administrative staff as well as the staff of the medical facility.

The system also includes a web server 1335 which is placed in direct connection with the data server 1325. The two servers are directly connected because of the excessive amount of volume transferred between the two devices. An exemplary version of the web server includes a dual processor with 2 GB RAM and appropriate software, such as Windows 2000 Server, and various web based databases that allow for manual and non-manual entry of information.

The web server serves the gateway for all users to pull reports. This function is separated from the data server so as to distribute the processing load. The details of the configuration of the web server hardware are included below in Table 2. These parameters may also be altered based on system need or system volume.

TABLE 2

Web Server Hardware Configuration

| Used By | OS + SW | SWAP File | Web Site | Total |
|---|---|---|---|---|
| RAID Configuration | RAID 1 | RAID 1 | RAID 1 | |
| Storage Location | Server | Server | Server | |
| Disk Size (GB) | 36 | 36 | 36 | |
| Number Of Disks | 2 | 2 | 2 | 6 Disks |
| Disk Speed | 15000 | 15000 | 15000 | |
| Total Data Space | 36 | 36 | 36 | |

An interface for the system is provided in the form of a website 1403 to access the information gathered by the radio frequency readers through a series of predefined reports, to determine, among other things, asset location and status. Part of this reporting functionality is includes a graphic display of assets, to be called the equipment location map. The interface also serves to request the equipment when required, fill outstanding equipment requests, and capture of preventative maintenance and other repair details, for assets. The capture of administrative data includes capturing census data for a facility, details of new/bought assets, and minimum stock levels for asset/area combinations. The above-mentioned functionality is provided only to the appropriate users, e.g. capture of asset details is only provided to authorized personnel.

The system is configured so that each medical facility in which the system is implemented can have variations in transaction volume (the number of tag reads transferred to the AgileTrac database), depending on the number of assets being tracked. Therefore, the hardware infrastructure and general database structure and design are easily modified based on the above-mentioned assumption. A description of the various computer devices implemented in the present system follows, however as mentioned above numerous modifications and variations of the present invention are possible in light of the teachings that follow.

FIG. 14 illustrates the optimum solution for running the system for a medical facility with high transaction volumes. The various hardware and software components could be upgraded based on the volume of asset tracking performed in a specific hospital setting.

Because the majority of the major processing is performed in the servers, the PC work stations required for clinical users and administrators need not be particularly powerful Minimum specification of Pentium 4 processors with 128 megabits of RAM, a 20 GB HDD and a standard 10/100 network card is suffice, provided that the PCs are not used for any other purpose. The required software for the client's machines is Windows XP, Internet Explorer Version 6.0. Again, these parameters are configurable based on customized system needs.

The system is split across multiple databases, but provides the following benefits: logical sections of the system are grouped together, database backups and logs are better controlled. Certain sections can be backed up more frequently, as the need is identified. It provides the flexibility to scale out in the future if necessary, and move each database to its own server. Databases are created on different disks, where parallel disk access can be used to improve efficiency. The various system databases are shown below in Table 3.

TABLE 3

System Databases

| AGILETRAC Section | Database Name (Data Device Name, Log Device Name) | Server | Description |
|---|---|---|---|
| Input Tables/Scan Table | aginput (aginput_data, aginput_log) | Data Server | All Transaction Input Data Tables, and all validated Transaction Data tables |
| Reporting Tables | agreport (agreport_data, agreport_log) | Data Server | De-normalized Reporting Tables. |
| Lookup/Admin Tables | aglookup (aglookup_data, aglookup_log) | Data Server | All Admin Data including Company Hierarchies |
| Work Tables | agwork (agwork_data, agwork_log) | Data Server | Processing Tables |
| Access Control | agwebadmin (agwebadmin_data, agwebadmin_log) | Data Server | System Admin - Setup Permissions, Admin Data . . . |
| Report Config | agreportadmin (agreportadmin_data, agreportadmin_log) | Data Server | Report Admin |

Reporting tables and reporting work tables do not follow the rules of normalization. They are de-normalized to aid in rapid retrieval of reports. Data integrity in these tables is managed by the processing module. All necessary indexes are included in the table definition in the specification, attached hereto. However, extra indexes can be created on these tables as the need may arise to increase processing efficiency.

Manual entry of information is optionally performed by way of the client PC, connecting to the web server, e.g. capture of preventive maintenance information. This information is saved to the database residing on the data server. This is achieved by using linked server profiles. A profile is set up in an SQL server on each server, identifying the other server and its location. This enables each server to make use of compiled stored procedures on the other server. Once the manual entry information has been saved to the data server, it is processed through the report tables and then replicated back to the web server, along with all transaction information.

Figure 15:
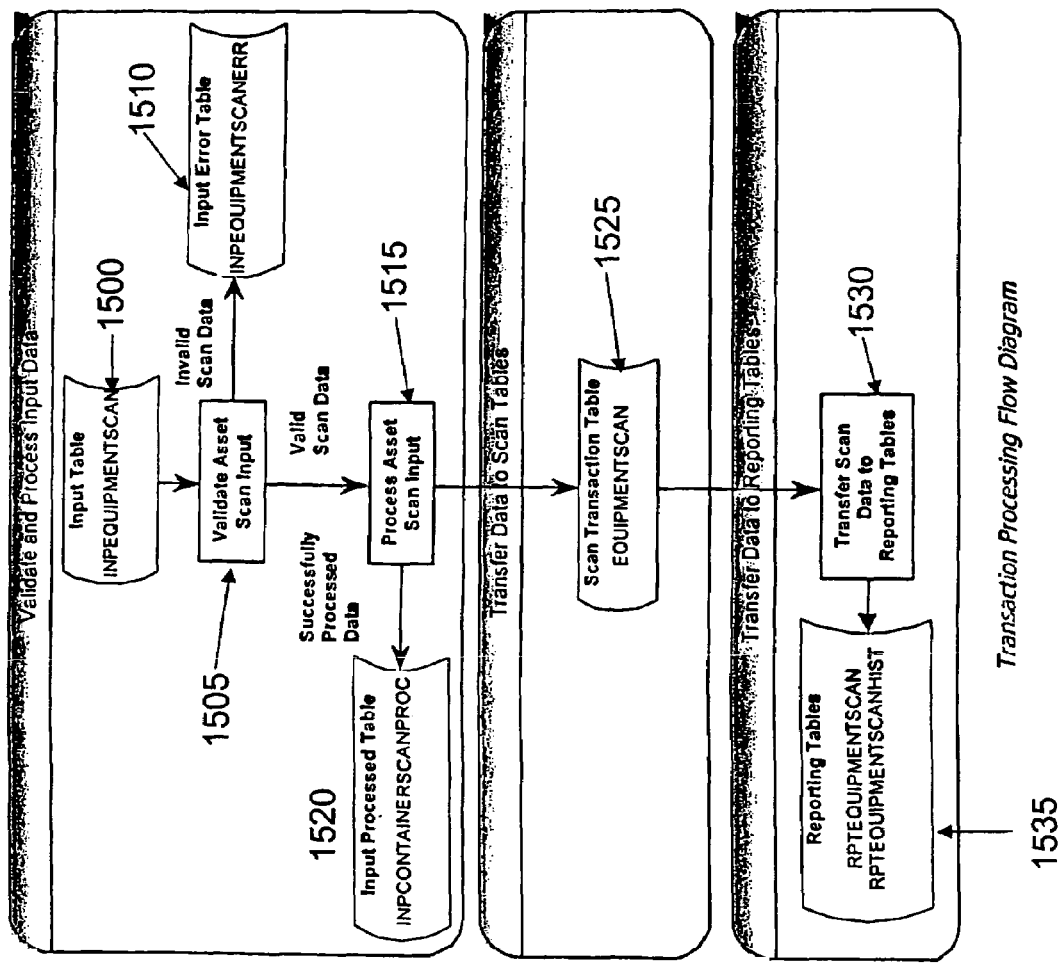
FIG. 15 illustrates the flow of data between the various databases of the according to the invention.

FIG. 15 illustrates a typical system operation when a tag read is performed and details the processing of transaction information from the moment it is inserted into the AgileTrac database in its raw format, to its final processed form, ready for reporting. All tables noted below form part of the Agile-Trac database. Raw tag information is inserted into an input table 1500 on the AgileTrac database, from the RF solution. While in this table, the information is validated 1505 to ensure data integrity, e.g. ensure that the area code for the transaction is valid, etc. Any invalid transaction information is moved to an input error table 1510 and removed from the input table.

All valid information in the input table is processed 1515 and moved to a input processed table 1520 and a transaction table 1525. Certain information is converted during this transfer process, i.e. all raw tag information is converted to codes where applicable, e.g. change tag number to equipment ID. Any valid data that is not successfully transferred for whatever reason is also be moved to the input error table and removed from the input table. The status of an asset is automatically set, based on the type of area it has been moved to.

All information that has been successfully moved from the input table to the transaction table 1525 is then moved to an input process table and removed from the end of the table. The input table is emptied once the processing of tag information is complete; to ensure that future processing occurs only on new information received by the RF solution.

All valid, converted information found on the transaction table is then checked for duplicate scans. Duplicate scans are defined as follows: two scans that have identical scan dates and times for the same equipment, a scan that has an earlier processed/unprocessed adjacent scan with exactly the same equipment and area information, a scan that has a later processed adjacent scan with exactly the same equipment and area information. All duplicate scans are marked as such in the transaction table.

Once duplicates are marked on a transaction table, reporting work tables 1535 are populated 1530. These tables are used specifically to aid in the population of the reporting tables described below. They are de-normalized tables that contain descriptive information to be used in the reporting tables:

Company hierarchy (RPTSITEAREA); i.e. holds all parent companies, with associated sites, areas and departments, all in one table.

Equipment definition (RPTEQUIPMENTDESC); i.e. holds all information pertaining to the TYPE of equipment each asset is associated to, including manufacturer, equipment group, model, preventive maintenance duration etc.

Equipment detail (RPTEQUIPMENT); i.e. holds all detailed information regarding each asset, e.g. hospital asset number, equipment id, primary storage location, cost centre, purchase date, warranty duration etc.

All reporting work tables contain codes and descriptions of the information held.

After the population of reporting work tables, all valid transaction information is transferred from the transaction table to reporting tables. These tables are from the data source for all reports defined for AGILE TRAC. There are two reporting tables as follows:

Reporting table that holds the entire scan history of every asset on the AgileTrac database.

Reporting table that holds only the last scan for every asset on the AgileTrac database.

The software and databases are also configured so that the direction of an RFID tag, as well as the inability for the RFID tag to be scanned can be taken into account. Further information about this capability can be found in the system specification incorporated herein by reference.

The information that is processed, sorted and conditioned by the aforementioned databases allow the users of the system to use the web-based interface to access information in the database and fulfill various requests, which will be described below. All of the functions listed below are more explicitly detailed in the system specification attached hereto.

Inventory detail functionality is provided to enable system users to capture information regarding new/bought over assets. This information is saved to the AgileTrac input database. Part of the inventory detail process is to transfer newly captured or edited equipment data to the reporting database, i.e. the entry of a newly tagged asset. An asset only has to be tagged and captured into the database once before it can be successfully tracked.

The software also allows clinical users to request equipment online by way of a web page. An equipment request can also be logged, which has been phoned in by medical facilities. Once a successful request has been submitted, central supply (i.e. the party in charge of fulfilling equipment requests) is automatically e-mailed, to be informed of the request. An e-mail will also be sent when an existing equipment request is modified or canceled informing the relevant parties of the action.

Previously submitted equipment requests can also be modified by a user of the system. This functionality provides users with the ability to edit certain information regarding previously placed equipment requests. Only specific information is editable, and the process to edit a request includes selecting the criteria to retrieve requests for editing. The criteria can be selected form the group of: department, area, and equipment group, the last two being optional. The user must also select an equipment request to edit, and finally edit the request and submit the edited request.

As discussed above, the software architecture can also be used to document the fulfillment of an equipment request. The web page interface allows central supply to fill equipment requests that have been logged by clinical users in a variety of ways. The requests can be filled as a request, filled with equipment in the requested equipment group, optionally including the manufacturer and model of requestor, and the online equipment request. The equipment may also be filled with a substitute, filled with equipment in the same equipment group but not the specific manufacturer or model, or filled by freeing up an asset that is available in the department. In such an instance when the equipment is already available in the department, the equipment is placed in the selected list of equipment. The request may also be indicated as being partially filled when the request is not completely filled with the requested quantity. Upon fulfillment of the request, an e-mail is optionally sent to the requesting department, stating that the equipment request has been fulfilled.

Preventative maintenance and repairs can also be tracked by the system databases. Preventative maintenance is required to be performed on the majority of assets being tracked by the system, and differs, based on the maintenance schedules laid out by the manufacturer of the asset. The web interface allows the user to track the preventative maintenance process for any asset, from beginning to end and allows for service notification reports to be generated so that a user is able to identify which assets are due for a preventative maintenance activity over a specified period of time.

Ad-hoc repair updates can also be tracked in the database. A web-based from is provided to allow for ad hoc repairs to be undertaken on any equipment. These repairs can either be performed in-house or by an external repair vendor. This functionality also allows the users to create a repair detail record including information such as when an asset goes into repair, when the repair is completed, and the party responsible for the repair.

Users of the system are also able to manually input the target quantity of a specific asset that they require in a specific area. Functionality is provided in the system that allows for the setup of target quantities per asset module, per storage location/pull point. This source data forms the basis for a low inventory level alert function. The low inventories alert is optionally in the form of an e-mail message that is sent from the system to the party in charge of delivering/replenishing assets. A low inventories report could also be generated, which includes a list of the areas which are reported to be below a specified inventory level.

Census data is also very valuable information when determining the most efficient use of medical equipment and assets. Thus, the system provides an interface for entry of patient populations into medical facilities on a daily basis.

Quantities can be added for patients booked in for an extended period of time, and for day patients. This allows for reporting of asset statistics relative to census data, and also indicates the areas of relative needs of assets based on patient population.

The system also provides the ability to generate various reports, which usually are formulated, based on various combinations of the different parameters stored in the database, and specific requests as input by the report requester. A description of the reports generated by the system is described in detail below.

The equipment request report provides a display of all online equipment requests made by the medical facility. The report typically includes a list of requests grouped by the department from which each request was sent. The system also provides reports including the fulfillment of equipment requests over a specified time period. A tangential report to the report indicating the fulfillment of equipment requests is the partially filled equipment report, which shows all equipment requests that have been only partially filled, twelve hours after the expiration of the request. This report shows partially filled equipment requests and standing order requests.

The equipment location map facilitates another report generated by the system, specifically, the equipment and inventory detail reports. Rather than use a graphical representation for the location of assets, a graphical map is used as a search tool to locate assets. A user can click on a web-based map to search for available equipment in a given area. The report shows a tabular result for the selected area, and optionally indicates hot spots on a JPEG image that correspond to a given area. Clicking on the hot spot generates a query that is the equivalent of selecting an area of the drop-down menu.

Inventory management reports are generated by the system to identify any inappropriate inventory levels at a given area. This report is used to monitor inventory levels on a per area basis, and thereby identify any inappropriate inventory levels in a specific area. The report is also used to quantify inventory turns per asset type, per area. An inventory turns report also is able to be generated, which monitors how efficiently assets are being used per area, i.e. how much time (measured in hours) an asset is used over a specified area. An equipment utilization report is also able to be generated, which shows the usage time, per model, based on the above-mentioned census data captured for a particular facility. Utilization statistics can be used to forecast future equipment needs based on statistical analysis of historical data.

Figure 16:
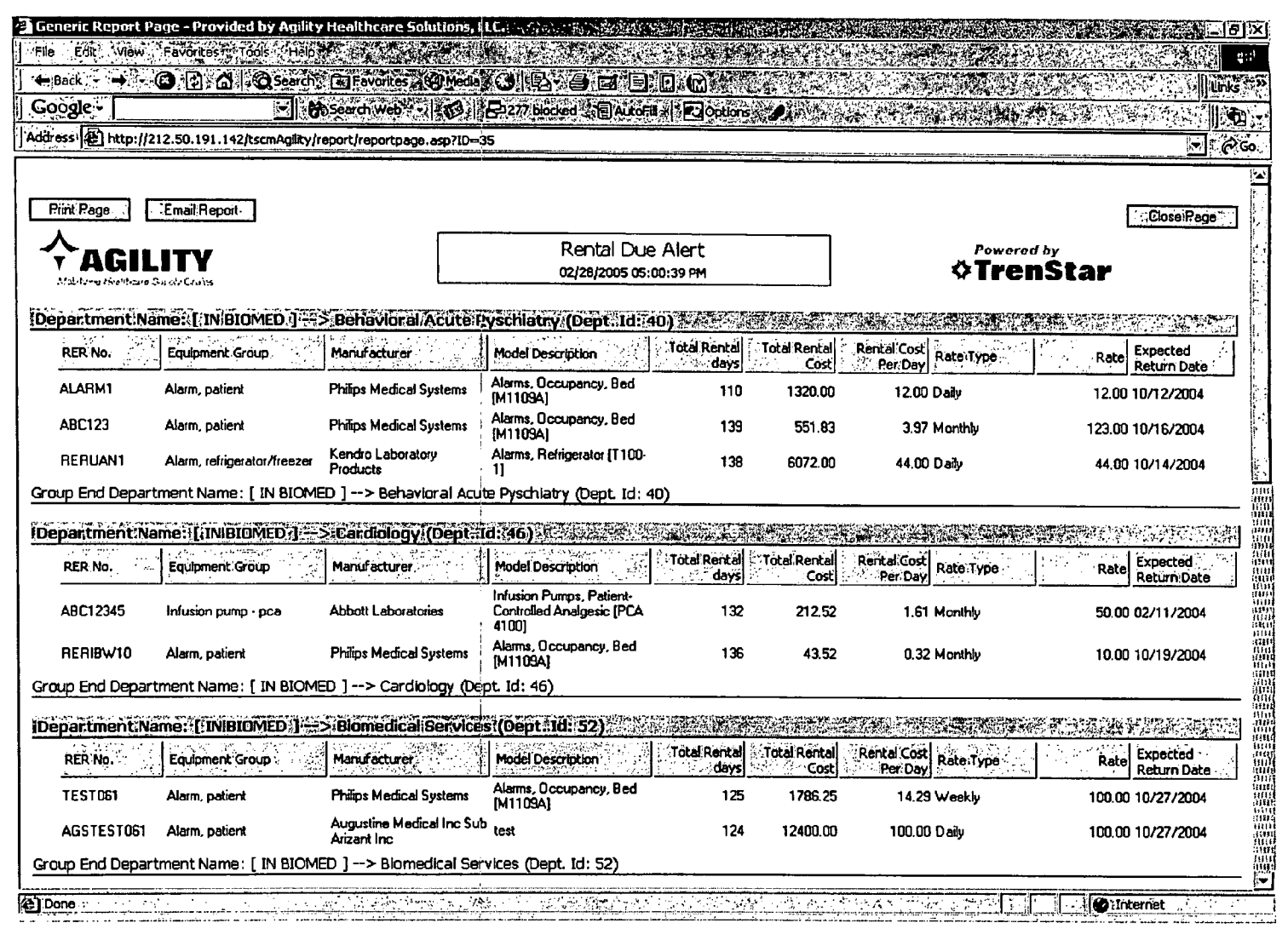

The software is also capable of providing reports for rental assets. Equipment rental is a relatively expensive and poorly managed function in hospitals, and the system provides the capability to generate three rental management reports. FIG. 16 is a screen shot showing the screen displayed by a user when a "Rental Due Alert" report is requested. The displayed items include an equipment code, equipment group, manufacturer, model description, total rental days, total rental cost, rental cost per day, rate type, rate, and expected return date.

Figure 17:
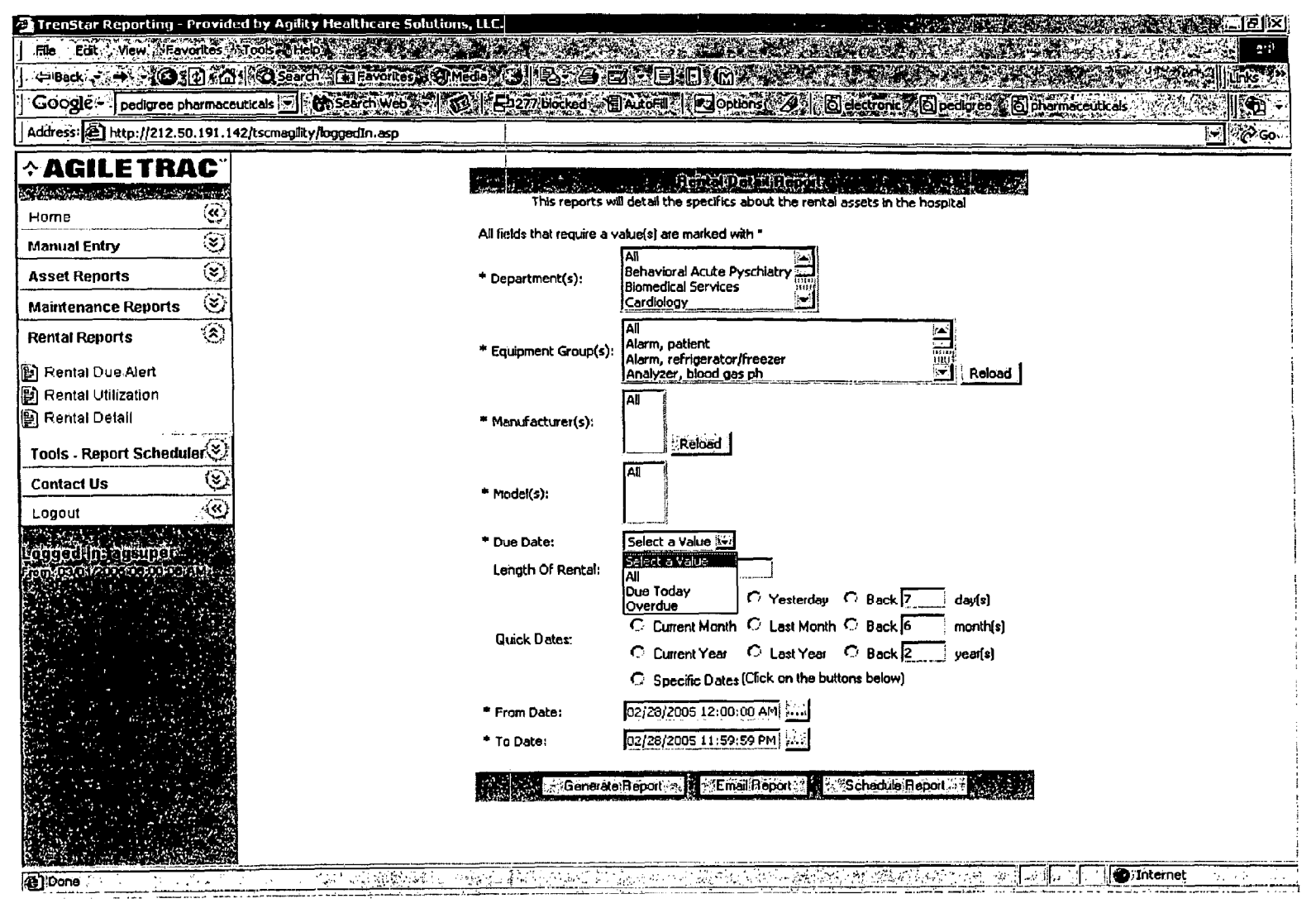

The "Rental Detail Report", depicted in FIG. 18, shows the information that is displayed upon the request for rental equipment using various parameters, such as, "Department(s)", "Equipment Group(s)", "Manufacturer(s)", "Model(s)", "Due Date", "Length of Rental", "From Date", and "To Date". The above-mentioned parameters can be selected by a user at the interface depicted in FIG. 17. Specifically, the user enters the specified criteria, base on the available parameters, and obtains the resulting "Rental Detail Report" shown in FIG. 18.

FIG. 19 shows a second level report that is available via upon the selection of a specified parameter in the user interface shown in FIG. 18. For example, FIG. 19 shows the result when the user selects the "ALARM1" equipment code. When this device is selected, only the information pertaining to this device is provided by the interface.

Figure 20:
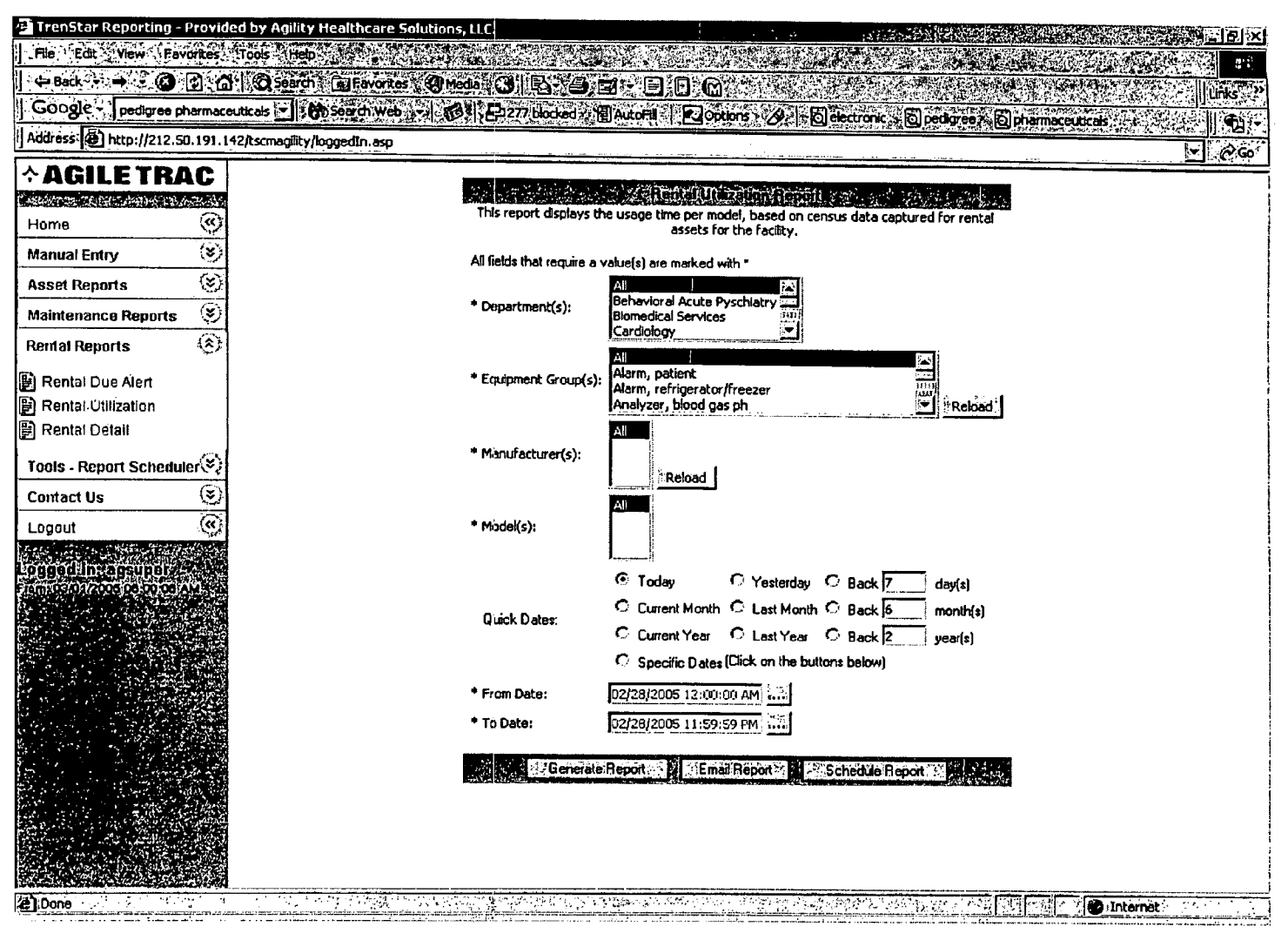
Figure 21:

A third rental report, shown in FIG. 21 provides utilization statistics for equipment rentals. The report provides rental statistics relative to patient census to determine rental requirements based on patient population, identify optimal rental periods, and determine when purchasing equipment is more economical than renting. FIG. 20 shows an example of a user interface used to provide input for the third rental report, depicted in FIG. 21.

Another report generated by the software is an equipment movement history report. This report shows a full history of all movements of an asset through a facility, over the specified time period. This report is configured to include various search parameters, based on the asset type the user wishes to track.

A missing asset report is also able to be generated, which shows all containers that system has not received tag reads for, for a specified period of time. This report is scheduled for a clinical user, so all tags listed in the report can be searched out, and once found, scanned by a hand-held scanner. There is no criteria page for the report. The report is also available on the website, to be pulled manually. This report provides the user with the ability to determine if an RFID tag has become defective, or if an asset has been removed from the building. Assets are also able to be assigned, via the database, to a particular area of the facility from which they are not to be removed. To facilitate this functionality, an illegal movement report can also be generated by the software system. This report shows containers that have moved into an illegal area as set up in the database table. The report includes a delay field, and its purpose is to hold the permissible amount of time a model can remain in a given area type. If the delay is set to zero, this means that the model may not enter the given area type for any period of time.

A static assets report is used to display assets which have not moved for a specified period of time. The software also provides extensive ability to control and view administrative data. Administrative data is maintained through a website to which only administrators is have access.

The various reports and user query functions discussed above can be utilized in a variety of ways by the administrators, or equipment purchasers, in the facility in which the system is implemented. Specifically, the data can be useful to the facility administrators in guiding them as to how to best use and acquire assets and generally manage inventory.

The data and reports and associated parameters are used in computer-based forecasting tools that allow administrators to estimate the future equipment needs for the facility. The census data provided above is able to reflect the population of the hospital at specific times of the year and could be used to determine the need for a specific product during the flu season, or during the summer when people might be more likely to break bones. The use of the census data allows the purchasers to estimate the variation in equipment or product needed during certain times of the year.

Also, the report indicating the duration that a product is located at a specific location may be indicative of its level of usage. Thus, if a product or piece of equipment goes unused for a long period of time, the purchasers are informed that more of that specific equipment is not required and that they can liquidate, or sell off, some of the excess equipment that is not being used.

The data can also be used to ensure that the equipment that the facility currently has in inventory is being used as efficiently as possible. If the equipment inventory alerts for a specific piece of equipment is consistently being set by one department, and another department consistently has a surplus of the indicated piece of equipment, then the user is aware that a redistribution of assets is needed.

The system also tracks the equipment requests. Thus, the frequency, or lack thereof, of equipment requests for an item may indicate that more, or less, of an item are needed. Also, if one department is constantly requesting a specific piece of equipment and another department consistently has an abundant supply of the item then the item can be redistributed accordingly.

Various other options are available to the users of the system as to how to best utilize that data obtained in tracking and management system. Multiple permutations of the report data and other parameters generated by the system can be used to allow administrators and/or purchasers to perform inventory management functions. These permutations can be in the form of automated reports or the like, and can be customized based on the user's preferences.

In one example, the data that is collected from the system is used to populate a database. As an example, perhaps the system includes a separate category for infusion pumps. The computer-based forecasting tool includes a threshold, which identifies a minimum number of infusion pumps that are required in a repository before an alert is issued. As an example, suppose in the basement of a hospital, in a storage area, 50 infusion pumps are kept for general use within the hospital. Then, in the maternity ward, which on average has 10 infusion pumps at any given time, requires the use of an additional 25, then the system will identify the 25 pumps are available from the basement storage facility. However, once the system detects that the 25 infusion pumps are moved to the maternity ward, the system identifies an alert that less than 50% (or any other predetermined number) of the infusion pumps are left in the repository in the basement storage facility.

The system also generates alerts that indicate that additional infusion pumps perhaps are kept in a "surplus" mode in specific wards within the hospital. For example, if the system identifies that 5 infusion pumps are kept in the radiation treatment ward and all the infusion pumps are kept in a closet (not in a patient's room), and the number of infusion pumps typically kept in a closet are 2, then the system will identify that 3 of the infusion pumps in the radiation treatment ward are available for repopulating the basement storage facility.

The various servers, user PC's and other processing devices may be configured as described below, however numerous modifications and variations of the system are possible in light of the above teachings.

Figure 22:
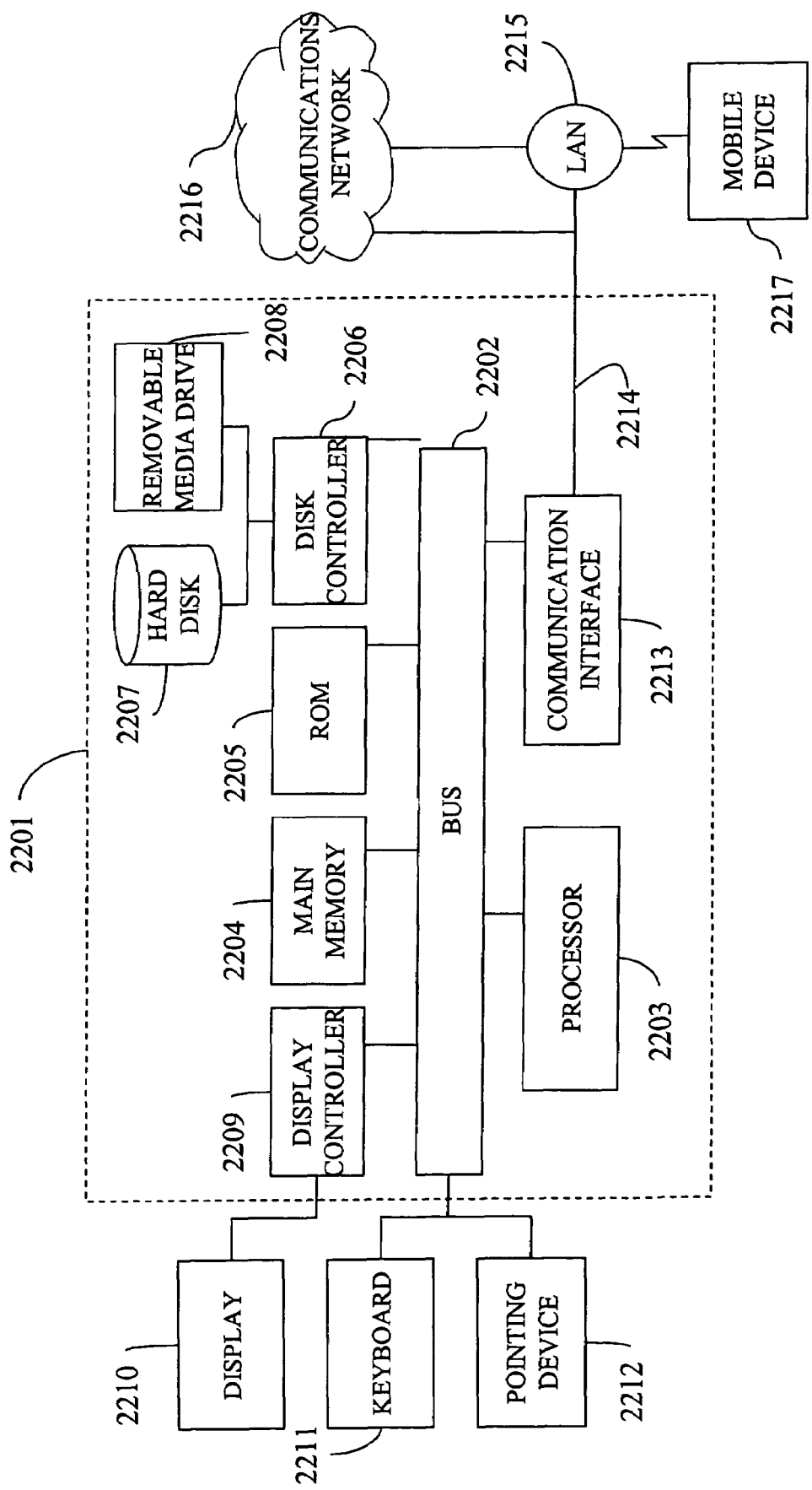
FIG. 22 shows a block diagram of a corporation device that could be used to implement various hardware components according to one embodiment of the present invention.

FIG. 22 illustrates a computer system 2201 upon which an embodiment of the present invention may be implemented. The computer system 2201 includes a bus 2202 or other communication mechanism for communicating information, and a processor 2203 coupled with the bus 2202 for processing the information. The computer system 2201 also includes a main memory 2204, such as a random access memory (RAM) or other dynamic storage device (e.g., dynamic RAM (DRAM), static RAM (SRAM), and synchronous DRAM (SDRAM)), coupled to the bus 2202 for storing information and instructions to be executed by processor 2203. In addition, the main memory 2204 may be used for storing temporary variables or other intermediate information during the execution of instructions by the processor 2203. The computer system 2201 further includes a read only memory (ROM) 2205 or other static storage device (e.g., programmable ROM (PROM), erasable PROM (EPROM), and electrically erasable PROM (EEPROM)) coupled to the bus 2202 for storing static information and instructions for the processor 2203.

The computer system 2201 also includes a disk controller 2206 coupled to the bus 2202 to control one or more storage devices for storing information and instructions, such as a magnetic hard disk 2207, and a removable media drive 2208 (e.g., floppy disk drive, read-only compact disc drive, read/write compact disc drive, compact disc jukebox, tape drive, and removable magneto-optical drive). The storage devices may be added to the computer system 2201 using an appropriate device interface (e.g., small computer system interface (SCSI), integrated device electronics (IDE), enhanced-IDE (E-IDE), direct memory access (DMA), or ultra-DMA).

The computer system 2201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2201 may also include a display controller 2209 coupled to the bus 2202 to control a display 2210, such as a cathode ray tube (CRT), for displaying information to a computer user. The computer system includes input devices, such as a keyboard 2211 and a pointing device 2222, for interacting with a computer user and providing information to the processor 2203. The pointing device 2212, for example, may be a mouse, a trackball, or a pointing stick for communicating direction information and command selections to the processor 2203 and for controlling cursor movement on the display 2210. In addition, a printer may provide printed listings of data stored and/or generated by the computer system 2201.

The computer system 2201 performs a portion or all of the processing steps of the invention in response to the processor 2203 executing one or more sequences of one or more instructions contained in a memory, such as the main memory 2204. Such instructions may be read into the main memory 2204 from another computer readable medium, such as a hard disk 2207 or a removable media drive 2208. One or more processors in a multi-processing arrangement may also be employed to execute the sequences of instructions contained in main memory 2204. In alternative embodiments, hard-wired circuitry may be used in place of or in combination with software instructions. Thus, embodiments are not limited to any specific combination of hardware circuitry and software.

As stated above, the computer system 2201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 2201, for driving a device or devices for implementing the invention, and for enabling the computer system 2201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 2203 for execution. A computer readable medium may take many forms, including but not limited to, non-volatile media, volatile media, and transmission media. Non-volatile media includes, for example, optical, magnetic disks, and magneto-optical disks, such as the hard disk 2207 or the removable media drive 2208. Volatile media includes dynamic memory, such as the main memory 2204. Transmission media includes coaxial cables, copper wire and fiber optics, including the wires that make up the bus 2202. Transmission media also may also take the form of acoustic or light waves, such as those generated during radio wave and infrared data communications.

Various forms of computer readable media may be involved in carrying out one or more sequences of one or more instructions to processor 2203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 2201 may receive the data on the telephone line and use an infrared transmitter to convert the data to an infrared signal. An infrared detector coupled to the bus 2202 can receive the data carried in the infrared signal and place the data on the bus 2202. The bus 2202 carries the data to the main memory 2204, from which the processor 2203 retrieves and executes the instructions. The instructions received by the main memory 2204 may optionally be stored on storage device 2207 or 2208 either before or after execution by processor 2203.

The computer system 2201 also includes a communication interface 2213 coupled to the bus 2202. The communication interface 2213 provides a two-way data communication coupling to a network link 2214 that is connected to, for example, a local area network (LAN) 2215, or to another communications network 2216 such as the Internet. For example, the communication interface 2213 may be a network interface card to attach to any packet switched LAN. As another example, the communication interface 2213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 2213 sends and receives electrical, electromagnetic or optical signals that carry digital data streams representing various types of information.

The network link 2214 typically provides data communication through one or more networks to other data devices. For example, the network link 2214 may provide a connection to another computer through a local network 2215 (e.g., a LAN) or through equipment operated by a service provider, which provides communication services through a communications network 2216. The local network 2214 and the communications network 2216 use, for example, electrical, electromagnetic, or optical signals that carry digital data streams, and the associated physical layer (e.g., CAT 5 cable, coaxial cable, optical fiber, etc). The signals through the various networks and the signals on the network link 2214 and through the communication interface 2213, which carry the digital data to and from the computer system 2201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 2201 can transmit and receive data, including program code, through the network(s) 2215 and 2216, the network link 2214 and the communication interface 2213. Moreover, the network link 2214 may provide a connection through a LAN 2215 to a mobile device 2217 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer program product for combination in a data server, the computer program product including a computer readable medium having stored thereon computer executable instructions for tracking and generating report data related to a radio frequency identification (RFID) tag in an indoor setting of a client, said computer readable instructions when executed to perform the steps comprising:

storing an RFID tag ID uniquely associated with each of plurality of RFID tagged assets to which an RFID tag is attached, and an asset data corresponding to each of the plurality of RFID tagged assets;

receiving an RFID tag ID and an RFID tag reader ID from an RFID tag reader having a coverage zone in the indoor setting which the RFID tag is located, wherein the RFID tag is configured to transmit a signal containing the RFID tag ID;

updating the data server with a location information for one or more of the plurality of RFID tagged assets as provided from the RFID tag reader;

receiving an equipment request for at least one of the plurality of RFID tagged assets;

updating the asset data corresponding to the at least one of the plurality of RFID tagged assets to indicate that the at least one of the plurality of RFID assets has been requested at a specific location;

receiving a report parameter indicating that a census report is requested, and generating a census report based on the report parameter and transmitting the census report to the client, wherein the census report includes the asset data corresponding to the at least one of the RFID tagged assets and a human population data corresponding to a number of people in geographic proximity to the at least one of the plurality RFID tagged assets.

2. The computer program product of claim 1, further comprising:
exchanging the asset data with a database, the database having portions of data stored at a different physical location.

3. The computer program product of claim 1, further comprising:
mounting the RFID tag reader at a plurality of fixed locations within a facility, and the RF field generated by each RFID tag reader corresponds to a zone within the facility.

4. The computer program product of claim 1, further comprising:
transmitting the asset data to a hand-held wireless device upon receiving the RFID tag ID from the RFID tag using the hand-held wireless device.

5. The computer program product of claim 1, wherein the asset data includes a historical data describing one or more past locations of the corresponding one or more of the plurality of RFID tagged assets.

6. The computer program product of claim 1, further comprising:
automatically performing a plurality of operations based upon a plurality of predefined rules.

7. A computer program product for combination with a date server, the product including a computer readable medium having stored thereon computer executable instructions for tracking and generating report data related to a radio frequency identification (RFID) tag in an indoor setting of a client, said computer executable instructions when executed by the data server representative of the steps comprising:
storing an RFID tag ID uniquely associated with each of a plurality of RFID tagged assets to which an RFID tag is attached, and an asset data corresponding to each of the plurality of RFID tagged assets;
receiving an RFID tag ID and an RFID tag reader ID from an RFID tag reader having a coverage zone in the indoor setting which the RFID tag is located, wherein the RFID tag is configured to transmit a signal containing the RFID tag ID;
updating the data server with location information for one or more of the plurality of RFID tagged assets as provided from the RFID tag reader;
receiving an equipment request for one or more of the plurality of RFID tagged assets;
updating the asset data corresponding to the one or more of the plurality of RFID tagged assets to indicate that the one or more of the plurality of RFID tagged assets has been requested at a specific location; and
updating a status of the one or more of the plurality of RFID tagged assets based upon a current location of the respective RFID tagged asset and a past location of the respective RFID tagged asset.

8. The computer program product of claim 7, further comprising:
transmitting a signal to a client device based upon the current location and the past location of the one or more of the plurality of RFID tagged assets.

9. The computer program product of claim 7, further comprising:
receiving a report parameters that corresponds to a newly acquired RFID tagged asset; and
transmitting the report data including the asset data corresponding to the newly acquired RFID tagged asset to a client device for display, wherein
the report data includes a data indicating at least an activation date and a type of asset.

10. The computer program product of claim 7, wherein the asset data includes a maintenance and repair information for one or more of the plurality of RFID tagged assets.

11. The computer program product of claim 10, further comprising:
receiving a report parameters requesting a report indicating one or more of the RFID tagged assets that are due for maintenance; and
transmitting the report to a client device including the asset data for the one or more of the plurality of RFID tagged assets that are due for maintenance, wherein
the asset data includes at least the current location of and a type of maintenance required on the one or more of the plurarity of RFID tagged assets.

12. A computer program product in combination with a data server, the product including a computer readable medium having stored thereon computer executable instructions for tracking and generating a report data related to a radio frequency identification (RFID) tag in an indoor setting of a client, said computer readable instructions when executed to perform the RFID tagged steps comprising:
storing an RFID tag ID uniquely associated with each of a plurality of RFID tagged assets to which an RFID tag is attached, and asset data corresponding to each of the plurality of RFID tagged assets;
receiving the RFID tag ID and an RFID tag reader ID from an RFID tag reader having a coverage zone in the indoor setting which the RFID tag is located, wherein the RFID tag is configured to transmit a signal containing the RFID tag ID;
updating the data server with a location information for one or more of the plurality of RFID tagged assets as provided from the RFID tag reader;
receiving an equipment request for a one or more of the plurality of RFID tagged assets;
updating the asset data corresponding to each of the one or more of the plurality of RFID tagged asset to indicate that the RDW tagged asset has been requested at a specific location;
receiving a target quantity of the plurality of RFID tagged assets required in a specific zone, and
generating an alert to be transmitted to a client device if a number of the plurality of RFID tagged assets in the specific zone falls below the target quantity.

13. The computer program product of claim 12, further comprising:
generating a GUI map indicating where one or more of the plurality of RFID tagged assets is located, and
transmitting the GUI map to allow the client to view a distribution of the one or more of the plurality of RFID tagged assets in a facility.

14. The computer program product of claim 13, wherein the GUI map includes a hyperlink that, when selected by a user, causes the data server to transmit the asset data corresponding to one or more of the plurality of RFID tagged assets to the client device for display.

15. The computer program product of claim 12, wherein the asset data includes a rental asset information of one or more of plurality of the RFID tagged assets.

16. The computer program product of claim 15, wherein the rental asset information includes at least one of due date, length of rental, from date, and to date.

17. The computer program product of claim 16, further comprising:
receiving a report parameters indicating that a rental report is requested, and
generating the rental report based on the report parameters and transmitting the rental report to the client.

18. The computer program product of claim 12, further comprising:
receiving a report parameters indicating that a census report is requested, and
generating a census report based on the report parameter and transmitting the census report to a client, wherein
the census report includes the asset data corresponding to one or more of the plurality of RFID tagged assets and a human population data corresponding to a number of people in a geographic proximity to the one or more of the plurality of RFID tagged assets.

19. A computer program product in combination with a data server, the product including a computer readable medium having stored thereon computer executable instructions for tracking and generating report data related to a radio frequency identification (RFID) tag in an indoor setting of a client, said computer readable instructions when executed to perform the steps comprising:
storing an RFID tag ID uniquely associated with each of a plurality of RFID tagged assets to which an RFID tag is attached, and asset data corresponding to each of the plurality of RFID tagged assets;
receiving the RFID tag ID and an RFID tag reader ID from an RFID tag reader having a coverage zone in the indoor setting which the RFID tag is located, wherein the RFID tag is configured to transmit a signal containing the RFID tag ID;
updating the data server with a location information for one or more of the plurality of RFID tagged assets as provided from the RFID tag reader;
receiving a direction of movement of one or more of the plurality of RFID tagged assets in the coverage zone from the RFID tag reader based on a comparison of the strength of the signal relative to a strength of at least one other subsequent signal from the RFID tag; and communicating the direction of the one or more of the RFID tagged assets to the data server to provide a report.

20. The computer program product of claim 1, further comprising:
updating a status of the one or more of the plurality of RFID tagged assets based upon a current location and a past location of the one or more of the plurality of RFID tagged assets.

21. The computer program product of claim 1, further comprising:
transmitting a signal to a client device based upon a current location and a past location of the one or more of the plurality of RFID tagged assets.

22. The computer program product of claim 1, further comprising:
receiving a report parameter that corresponds to a newly acquired RFID tagged asset; and
transmitting the report data including an asset data corresponding to the newly acquired RFID tagged assets to a client device for display, wherein
the report data includes data indicating at least an activation date and a type of asset.

23. The computer program product of claim 1, wherein the asset data includes a maintenance and repair information for one or more of plurality of RFID tagged assets.

24. The computer program product of claim 23, further comprising:
receiving a report parameters requesting a report indicating one or more of the plurality of RFID tagged assets due for maintenance; and
transmitting a report to a client device including the asset data for one or more of the plurality of RFID tagged assets that are due for maintenance, wherein
the asset data indicates at least a location and a type of maintenance required on the one or more of the plurality of RFID tagged assets.

25. The computer program product of claim 1, further comprising:
receiving a target quantity of one or more of the plurality of RFID tagged assets required in a specific zone, and
generating an alert to be transmitted to a client device if a number of assets in the specific zone falls below the target quantity.

26. The computer program product of claim 1, further comprising:
generating a GUI map indicating where the one or more of the plurality of RFID tagged assets are located, and
transmitting the GUI map to allow a user to view a distribution of assets in the facility.

27. The computer program product of claim 26, wherein the map includes hyperlinks that, when selected, cause the data server to transmit the asset data corresponding to one or more of the plurality of RFID tagged assets to the client device for display.

28. The computer program product of claim 1, wherein the asset data includes a rental asset information of one or more of the plurality of RFID tagged assets.

29. The computer program product of claim 28, wherein the rental asset information includes at least one of a due date, a length of rental, a from date, and a to date.

30. The computer program product of claim 7, further comprising:
mounting RFID tag reader at a plurality of fixed locations within a facility, and the RF field generated by each RFID tag reader corresponds to a zone within the facility.

31. The computer program product of claim 7, further comprising:
transmitting the asset data to a hand-held wireless device upon receiving the RFID tag ID from the RFID tag using the hand-held wireless device.

32. The computer program product of claim 7, further comprising:
receiving a target quantity of one or more of the RFID tagged assets required in a specific zone, and
generating an alert to be transmitted to a client device if a number of the one or more of the plurality of RFID tagged assets in the specific zone falls below the target quantity.

33. The computer program product of claim 7, further comprising:
generating a GUI map indicating where one or more of the plurality of RFID tagged assets is located, and
transmitting the GUI map to allow the client to view a distribution of the one or more of the plurality of RFID tagged assets in a facility.

34. The computer program product of claim 33, wherein the GUI map includes a hyperlink that, when selected, causes the data server to transmit the asset data corresponding to one or more of the plurality of RFID tagged assets to the client device for display.

35. The computer program product of claim 7, wherein the asset data includes a rental asset information of the one or more of the plurality of RFID tagged assets.

36. The computer program product of claim 35, wherein the rental asset information includes at least one of a due date, a length of rental, a from date, and a to date.

37. The computer program product of claim 7, further comprising:
receiving a report parameter indicating that a census report is requested, and
generating the census report based on the report parameter and transmitting the census report to the client, wherein
the census report includes the asset data corresponding to one or more of the plurality of RFID tagged assets and a human population data corresponding to a number of people in geographic proximity to the one or more of the plurality of RFID tagged assets.

38. The computer program product of claim 12, further comprising:
mounting the RFID tag reader at a plurality of fixed locations within a facility, and the RF field generated by each RFID tag reader corresponds to a zone within the facility.

39. The computer program product of claim 12, further comprising:
transmitting the asset data to a hand-held wireless device upon reading information from the RFID tag using the hand-held wireless device.

40. The computer program of claim 12, further comprising:
updating a status of one or more of the plurality of RFID tagged assets based upon a current location and a past location of the one or more of the plurality of RFID tagged assets.

41. The computer program product of claim 12, further comprising:
transmitting a signal to a client device based upon a current location and a past location of the one or more of the plurality of RFID tagged assets.

42. The computer program product of claim 12, further comprising:
receiving a report parameter that corresponds to newly acquired RFID tagged asset; and
transmitting the report data corresponding to the newly acquired RFID tagged asset to a client device for display, wherein
the report data includes data indicating at least an activation date and a type of asset.

43. The computer program product of claim 12, wherein the asset data includes a maintenance and repair information for one or more of the plurality of RFID tagged assets.

44. The computer program product of claim 12, further comprising:
receiving a report parameter requesting a report indicating one or more of the plurality of RFID tagged assets due for maintenance; and
transmitting the report to a client device including the asset data for one or more of the plurality of RFD tagged assets due for maintenance, wherein
the asset data includes at least a location, and a type of maintenance required on the one or more of the plurality of RFID tagged assets.

* * * * *

UNITED STATES PATENT AND TRADEMARK OFFICE
CERTIFICATE OF CORRECTION

PATENT NO. : 7,633,392 B2
APPLICATION NO. : 11/121954
DATED : December 15, 2009
INVENTOR(S) : Daniel Neuwirth Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 585 days.

Signed and Sealed this

Ninth Day of November, 2010

David J. Kappos
*Director of the United States Patent and Trademark Office*